(12) United States Patent
Ammar et al.

(10) Patent No.: US 12,455,439 B2
(45) Date of Patent: Oct. 28, 2025

(54) DIGITAL MICROSCOPY SYSTEM FOR 3D OBJECTS

(71) Applicant: Schlumberger Technology Corporation, Sugar Land, TX (US)

(72) Inventors: Mahdi Ammar, Clamart (FR); Simone Di Santo, Dhahran (SA); Ngoc Hoang Lan Huynh, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/729,197

(22) PCT Filed: Mar. 23, 2023

(86) PCT No.: PCT/US2023/015998
§ 371 (c)(1),
(2) Date: Jul. 16, 2024

(87) PCT Pub. No.: WO2023/183445
PCT Pub. Date: Sep. 28, 2023

(65) Prior Publication Data
US 2025/0231393 A1    Jul. 17, 2025

(30) Foreign Application Priority Data

Mar. 24, 2022  (EP) ..................................... 22305361
Aug. 9, 2022  (EP) ..................................... 22306204

(51) Int. Cl.
*G02B 21/36* (2006.01)
*G02B 21/06* (2006.01)
*G06T 7/90* (2017.01)

(52) U.S. Cl.
CPC ........... *G02B 21/365* (2013.01); *G02B 21/06* (2013.01); *G06T 7/90* (2017.01); *G06T 2207/10056* (2013.01)

(58) Field of Classification Search
CPC ........ G02B 21/365; G02B 21/06; G06T 7/90; G06T 2207/10056
(Continued)

(56) References Cited

U.S. PATENT DOCUMENTS 1,179,089 A    4/1916    Gibson
7,936,374 B2    5/2011    Cutler
(Continued)

FOREIGN PATENT DOCUMENTS

CN    111141698 A    5/2020
EP    3896496 A1    10/2021
(Continued)

OTHER PUBLICATIONS

Becerra, D et al., "Generating a labeled data set to train machine learinig algorithms for lithologic classification of drill cuttings", Special section: Machine learning for image-based geologic interpretation, SEG, 2022, pp. SE85-SE100.
(Continued)

*Primary Examiner* — Allen C Wong
(74) *Attorney, Agent, or Firm* — Jeffrey D. Frantz

(57) ABSTRACT

A method can include using a digital camera of a digital microscopy system, acquiring a digital image of an engineered three-dimensional object positioned on a base and illuminated by a light source; using the digital camera, acquiring a digital image of a color checker card positioned on the base and illuminated by the light source; determining a light source criterion by assessing position of the light source based at least in part on a shadow in the digital image of the engineered three-dimensional object as cast by the (Continued)

engineered three-dimensional object and based at least in part on saturation of color in the digital image of the color checker card; and calibrating the digital microscopy system using the light source criterion to generate a calibrated digital microscopy system.

20 Claims, 13 Drawing Sheets

(58) Field of Classification Search
USPC .......................................................... 348/79
See application file for complete search history.

(56) References Cited

U.S. PATENT DOCUMENTS

| | | | |
|---|---|---|---|
| 8,170,799 | B2 | 5/2012 | Dvorkin et al. |
| 9,142,045 | B1 | 9/2015 | Cavanaugh |
| 9,412,023 | B1 | 8/2016 | Hurley |
| 9,507,047 | B1 | 11/2016 | Dvorkin |
| 9,652,684 | B2 | 5/2017 | Keskes |
| 10,927,671 | B1 | 2/2021 | Tonner |
| 10,991,078 | B2 | 4/2021 | Hakimuddin |
| 11,188,794 | B2 | 11/2021 | Yao |
| 11,649,723 | B2 | 5/2023 | Allo |
| 2005/0276513 | A1 | 12/2005 | Ojanen |
| 2010/0128932 | A1 | 5/2010 | Dvorkin |
| 2012/0123756 | A1 | 5/2012 | Wang |
| 2013/0073207 | A1 | 3/2013 | Ganz |
| 2013/0120763 | A1 | 5/2013 | Grenet |
| 2013/0259190 | A1 | 10/2013 | Walls |
| 2013/0308831 | A1 | 11/2013 | Dvorkin |
| 2014/0046628 | A1 | 2/2014 | Ligneul |
| 2015/0043787 | A1 | 2/2015 | Fredrich |
| 2016/0370274 | A1 | 12/2016 | Rowe |
| 2017/0085860 | A1 | 3/2017 | Zhang |
| 2018/0101962 | A1 | 4/2018 | Takizawa et al. |
| 2018/0180524 | A1 | 6/2018 | Francois |
| 2019/0212272 | A1 | 7/2019 | Scoullar |
| 2019/0338637 | A1 | 11/2019 | Francois |
| 2019/0368336 | A1 | 12/2019 | Hammond |
| 2020/0025667 | A1 | 1/2020 | Allo |
| 2020/0143205 | A1 | 5/2020 | Yao |
| 2020/0150307 | A1 | 5/2020 | Myers |
| 2020/0157929 | A1 | 5/2020 | Torrione |
| 2021/0041588 | A1 | 2/2021 | Chen |
| 2021/0254457 | A1 | 8/2021 | Anifowose |
| 2021/0312674 | A1 | 10/2021 | Abrol |
| 2021/0319257 | A1 | 10/2021 | Francois |
| 2023/0184992 | A1 | 6/2023 | AlBahrani |
| 2023/0220761 | A1 | 7/2023 | Yamada |
| 2023/0220770 | A1 | 7/2023 | Yamada |
| 2023/0276551 | A1* | 8/2023 | Arfan ............... H04N 23/88 315/151 |
| 2023/0351580 | A1 | 11/2023 | Di Santo |
| 2023/0363830 | A1* | 11/2023 | Polchin ............ A61B 5/7425 |
| 2024/0054766 | A1 | 2/2024 | Yu |

FOREIGN PATENT DOCUMENTS

| | | | |
|---|---|---|---|
| WO | 2019167030 | A1 | 9/2019 |
| WO | 2022032057 | A1 | 2/2022 |
| WO | 2024020523 | A1 | 1/2024 |

OTHER PUBLICATIONS

Abbireddy, C.O.R et al., "A method of estimating the form of fine particulates", Geotechnique 2009, 59(6), pp. 503-511.
Barrett, P. J. "The shape of rock particles, a critical review", Sedimentology, 1980, 27, pp. 291-303.
Caicedo, J. C. et al., "Nucleus segmentation across imaging experiments: the 2018 Data Science Bowl", Nature Methods, 2019, 16, pp. 1247-1253.
Dunlop, H. et al., "Multi-scale Features for Detection and Segmentation of Rocks in Mars Images", 2007, 10.1109/CVPR.2007. 383257, 7 pages.
Feng, L. et al., "Robust Nucleus Detection with Partially Labeled Exemplars", IEEE Access (7), 2019, pp. 162169-162178.
Gaetano, R. et al., "Hierarchical Texture-Based Segmentation of Multiresolution Remote-Sensing Images", IEEE Transactions on Geoscience and Remote Sensing, 2009, 47(7), pp. 2129-2141.
He, K. et al., " Mask R-CNN", Computer Vision (ICCV), IEEE International Conference on Computer Vision, 2017, pp. 2980-2988.
He, K. et al., "Deep Residual Learning for Image Recognition", 2016 IEEE International Conference on Computer Vision, 2016, pp. 770-778.
Huo, F. et al., "Novel lithology identification method for drilling cuttings under PDC bit condition", Journal of Petroleum Science and Engineering, 2021, 205, 15 pages.
Jung, H. et al., "An automatic nuclei segmentation method based on deep convolutional neural networks for histopathology images", BMC Biomedical Engineering, 2019, 1:24, 12 pages.
Lin, T. Y., et al., "Microsoft COCO: Common Objects in Context", ECCV 2014: Computer Vision—ECCV 2014, pp. 740-755.
Lin, T.-Y., et al., "Feature Pyramid Networks for Object Detection", Computer Vision and Pattern Recognition (CVPR), IEEE International Conference on Computer Vision 2017, pp. 936-944.
Rahmani, H. et al., "Automated segmentation of gravel particles from depth images of gravel-soil mixtures", Compute and Geosciences, 2019, 128, pp. 1-10.
Ravali, K. et al., "Graph—Based High Resolution Satellite Image Segmentation For Object Recognition", The International Archives of the Photogrammetry, Remote Sensing and Spatial Information Sciences, 2014, vol. XL-8, pp. 913-917.
SANXO—Scope HD U4 Express: Industrial Microscope downloaded from the internt at [https://sanxo.eu/sanxo-scope-hd-u4-express-industrial-microscope/] on Apr. 21, 2022, 8 pages.
Shi, J. et al., "Normalized Cuts and Image Segmentation", IEEE Transactions on Pattern Analysis and Machine Intelligence, 2000, 22(8), pp. 888-905.
Thurley, M. J., "Automated Image Segmentation and Analysis of Rock Piles in an Open-Pit Mine", International Conference on Digital Image Computing: Techniques and Applications (DICTA), 2013, 10.1109/DICTA.2013.6691484, 8 Pages.
Ting, G. et al., "Rock Particle Image Segmentation Based on Improved Normalized Cut", International Journal of Control and Automation, 2017, 10(4), pp. 271-286.
Wang, W., "Rock Particle Image Segmentation and Systems", in Pattern Recognition Techniques, Technology and Applications, Book edited by: Peng-Yeng Yin, Nov. 2008, I-Tech, Vienna, Austria, 10.5772/6242, 30 pages.
Wikipedia "Semi Supervised Learning" downloaded from the internet at [https://en.wikipedia.org/wiki/Semi-supervised_learning] retrieved on Apr. 21, 2022, 7 pages.
Wikipedia "Transfer Learning" downloaded from the internet at [https://en.wikipedia.org/wiki/Transfer_learning] retrieved on Apr. 21, 2022, 5 pages.
Wikipedia "Run-length encoding", downloaded from the internet at [https://en.wikipedia.org/wiki/Run-length_encoding] retrieved on Apr. 21, 2022, 3 pages.
"pytorch/vision" downloaded from the internet at [https://github.com/pytorch/vision] retrieved on Apr. 21, 2022, 6 pages.
"Mongoose Pro Dynamic dual-motion shaker", retrieved from the internet: [https://www.slb.com/drilling/drilling-fluids-and-well-cementing/solids-control/shale-shakers/mongoose-pro-shale-shaker] Apr. 19, 2022, 9 pages.
Using colorcheck. Imatest, Retrieved Mar. 4, 2022, from https://www.imatest.com/docs/colorcheck/, 26 pages.
Sharpness: What is it and how it is measured. Imatest, Retrieved Mar. 4, 2022, from https://www.imatest.com/docs/sharpness/, 17 pages.
Beard et al., Influence of texture on porosity and permeability of unconsolidated sand. American Association of Petroleum Geologists Bulletin, vol. 27, No. 2, Feb. 1973, p. 349-369.

(56) References Cited

OTHER PUBLICATIONS

Ameen et al., The function of fractures and in-situ stresses in the Khuff reservoir performance, onshore fields, Saudi Arabia, American Association of Petroleum Geologists Bulletin, vol. 94, No. 1, Jan. 2010, pp. 27-60.

Blaschke et al., Object-Based Image Analysis. Springer. p. 37. ISBN: 978-3-540-77057-2, 2008, 30 pages.

Liang, Z. et al., "A particle shape extraction and evaluation method using a deep convolutional neural network and digital image processing", Powder Technology, 2019, 353, pp. 156-170.

\* cited by examiner

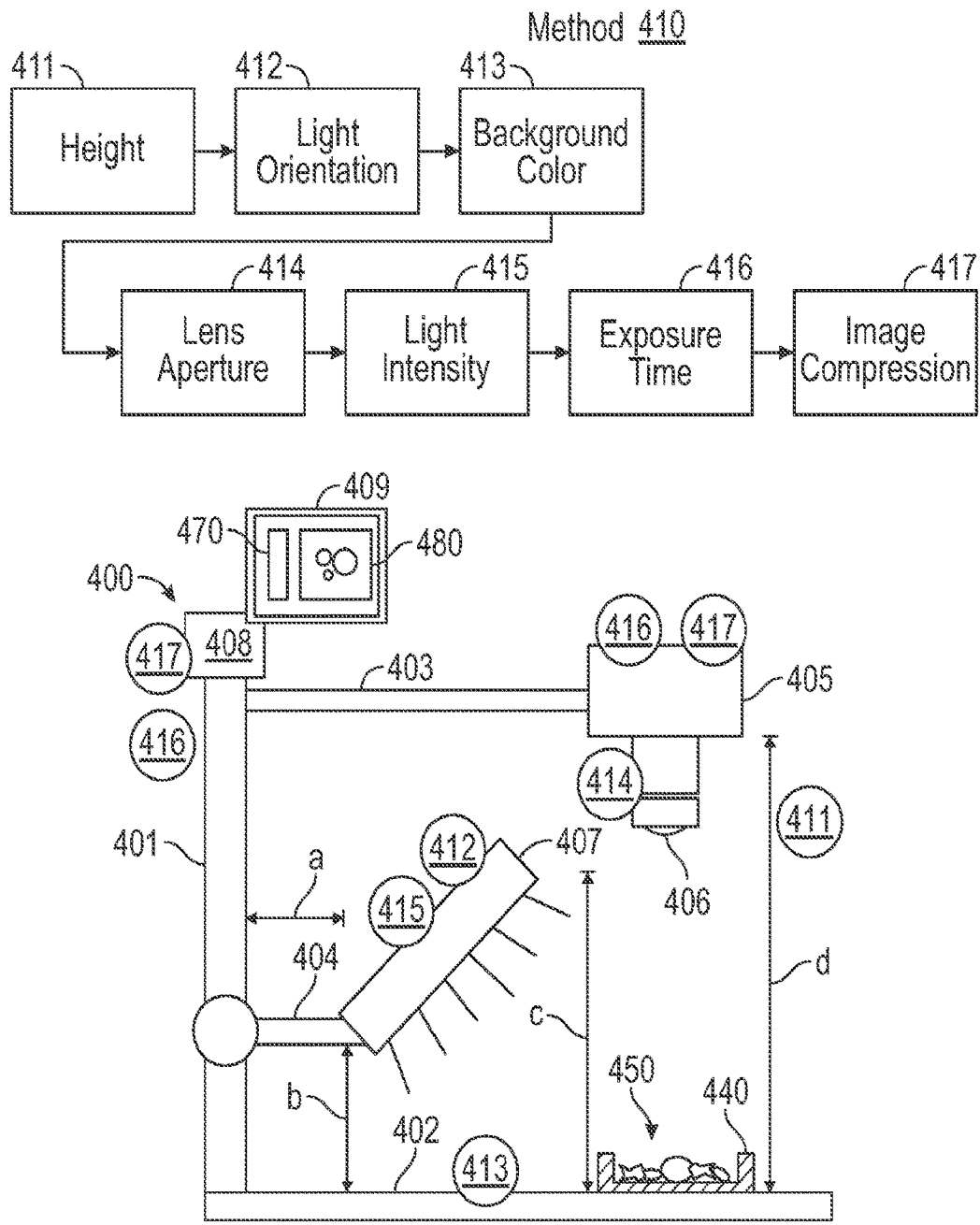
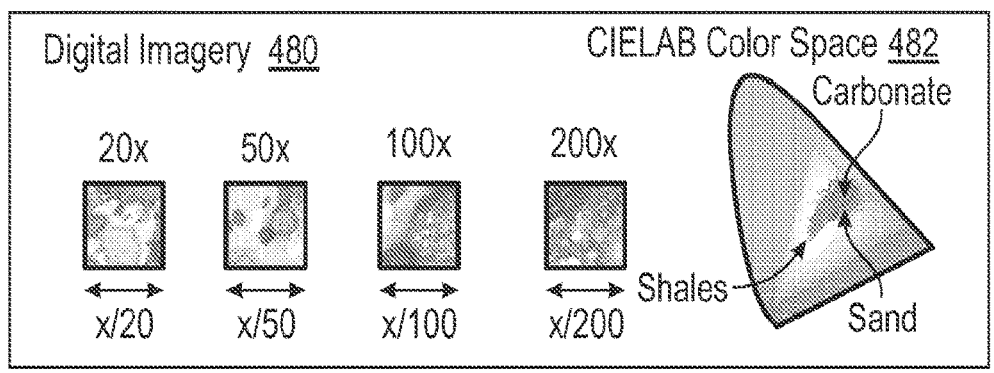
FIG. 4

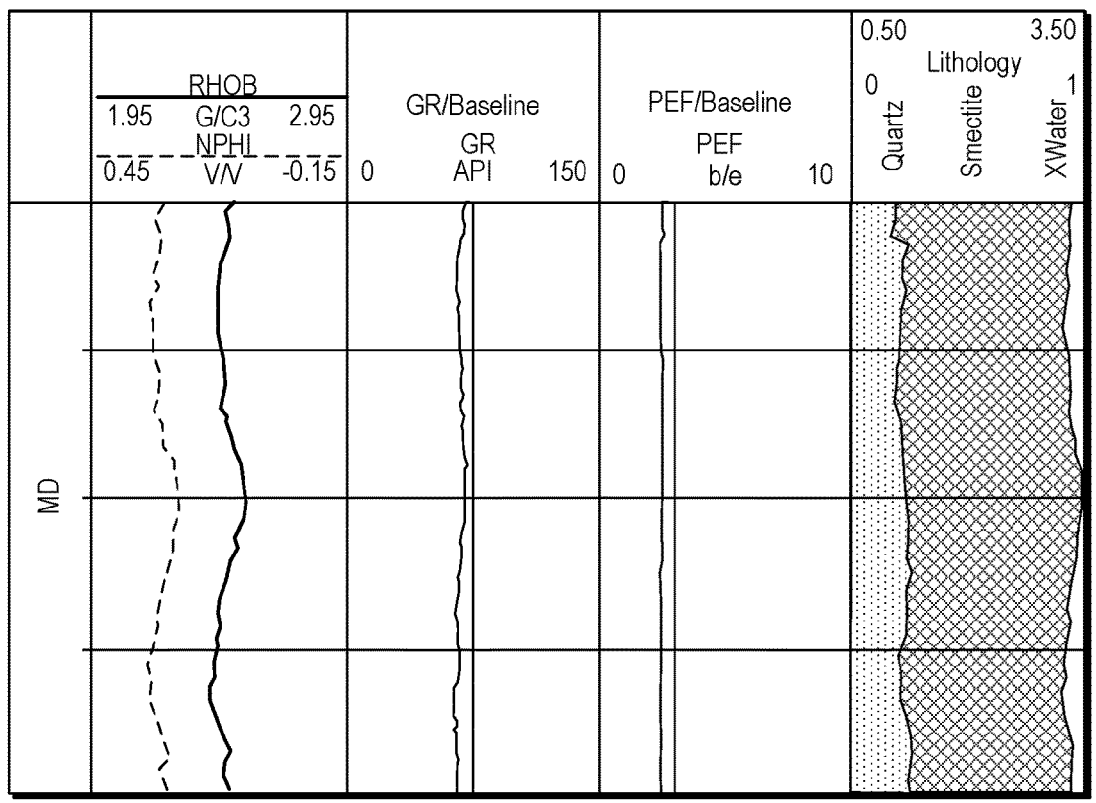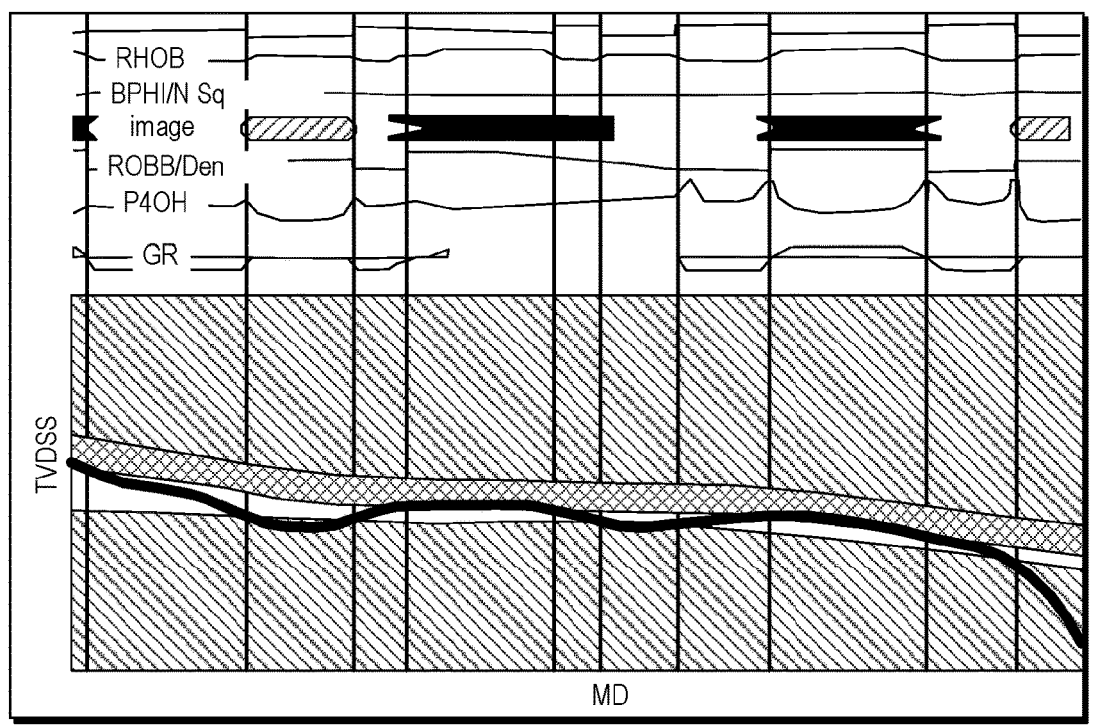
Fig. 6

| 710 | Target | Acceptable Range | |
|---|---|---|---|
| Calibration Value | 0.0113 | 0.0111 | 0.0115 |
| Corresponding FOV | 55 mm x 31 mm | 54mm x 31 mm | 56 mm x 32 mm |

| 720 | Target | Acceptable Range |
|---|---|---|
| Shadow Size | 4 mm | 3.5 mm to 4.5 mm |

| 730 | ΔE00 | Mean Camera Chroma (saturation) | MTF50 (cycles/mm) |
|---|---|---|---|
| Best Result | approx. 4.8 | approx. 100% | approx. 103 |
| Acceptace Range | < 5.5 | 90% to 110% | 80 to 110 |

810

| Optimized Settings | |
|---|---|
| 1. Camera Height | 266 mm from base |
| 2. Light Orientation | 75 mm x 90 mm x 160 mm |
| 3. Background | Not white and gloss |
| 4. Lens Aperture | 4 |
| 5. Light Intensity | Maximum light intensity (350 mA) |
| 6. Exposure Level | 16 ms |
| 7. Image Compression | PNG, no compression |
| 8. Configuration File | R = 25, G = 0, B = 29 |

820

| | Method | Frequency |
|---|---|---|
| Verify shadow size | Use engineered object (EO) | After completing hardware installation OR After adjusting light orientation |
| Perform color calibration | Use 18% gray card and image management application | Once every 12 months to reduce deterioration of light |
| Perform distance calibration | Use calibration card | Each imaging session OR After adjusting camera height |
| Verify field of view | Check calibration value from image metadata | Each imaging session OR After adjusting camera height |
| Verify image quality:<br>_ ΔE00<br>_ Saturation<br>_ Sharpness | Use color checker and image analysis application | Each imaging session OR After adjusting one or more system components |

Fig. 8

DIGITAL MICROSCOPY SYSTEM FOR 3D OBJECTS

CROSS-REFERENCE TO RELATED APPLICATIONS

This application claims priority to European Patent Application No. 22306204.3, filed Aug. 9, 2022, and European Patent Application No. 22305361.2, filed Mar. 24, 2022. The contents of the foregoing applications are incorporated by reference herein in their entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations. In such an example, control may be based at least in part on characteristics of rock, which can be present as three-dimensional objects in drilling fluid (e.g., mud).

SUMMARY

A method can include using a digital camera of a digital microscopy system, acquiring a digital image of an engineered three-dimensional object positioned on a base and illuminated by a light source; using the digital camera, acquiring a digital image of a color checker card positioned on the base and illuminated by the light source; determining a light source criterion by assessing position of the light source based at least in part on a shadow in the digital image of the engineered three-dimensional object as cast by the engineered three-dimensional object and based at least in part on saturation of color in the digital image of the color checker card; and calibrating the digital microscopy system using the light source criterion to generate a calibrated digital microscopy system. A system can include a digital camera; a light source; a processor; memory accessible to the processor; and processor-executable instructions stored in the memory to instruct the system to: using the digital camera, acquire a digital image of an engineered three-dimensional object positioned on a base and illuminated by the light source; using the digital camera, acquire a digital image of a color checker card positioned on the base and illuminated by the light source; and determine a light source criterion using at least the processor via an assessment of position of the light source based at least in part on a shadow in the digital image of the engineered three-dimensional object as cast by the engineered three-dimensional object and based at least in part on saturation of color in the digital image of the color checker card. One or more non-transitory computer-readable storage media can include processor-executable instructions to instruct a computing system to: using a digital camera, acquire a digital image of an engineered three-dimensional object positioned on a base and illuminated by a light source; using the digital camera, acquire a digital image of a color checker card positioned on the base and illuminated by the light source; and determine a light source criterion via an assessment of position of the light source based at least in part on a shadow in the digital image of the engineered three-dimensional object as cast by the engineered three-dimensional object and based at least in part on saturation of color in the digital image of the color checker card. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 4 illustrates an example of a digital microscopy system, examples of digital images and an example of a method;

FIG. 6 illustrates examples of graphical user interfaces;

FIG. 8 illustrates examples of tables of settings and techniques;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
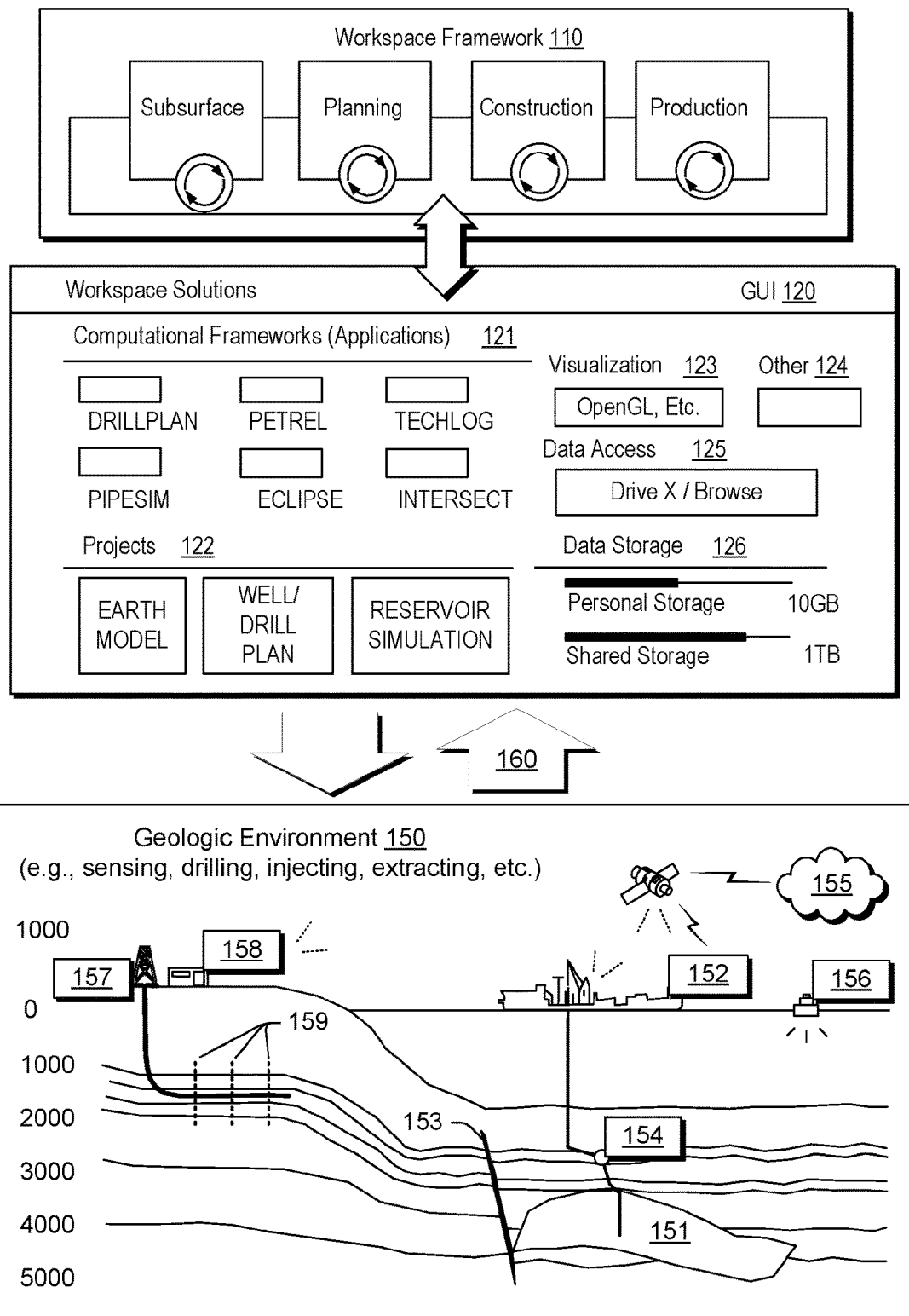
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

Figure 2:
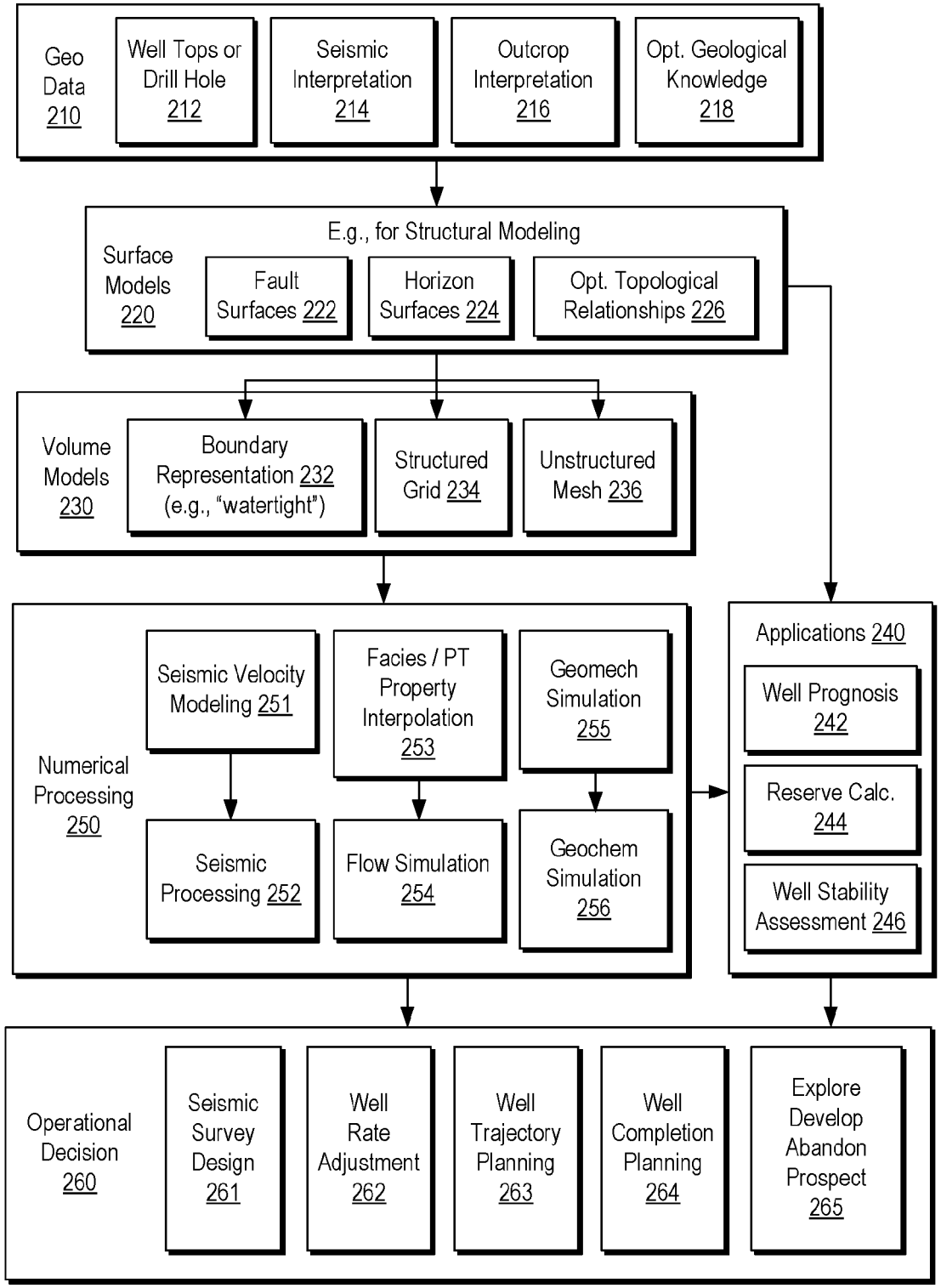
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As an example, the geological/geophysical data block 210 can include data from digital images, which can include digital images of cores, cuttings, cavings, outcrops, etc. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g., fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data, which can include geo data per the geo data block 210. In various examples, geo data may be acquired during one or more operations. For example, consider acquiring geo data during drilling operations via downhole equipment and/or surface equipment. As an example, the operational decision block 260 can include capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making. As an example, data quality may be improved by calibrating equipment. For example, consider calibration of a digital microscopy system that can acquire digital images of three-dimensional objects such as cuttings, cavings, etc.

Figure 3:
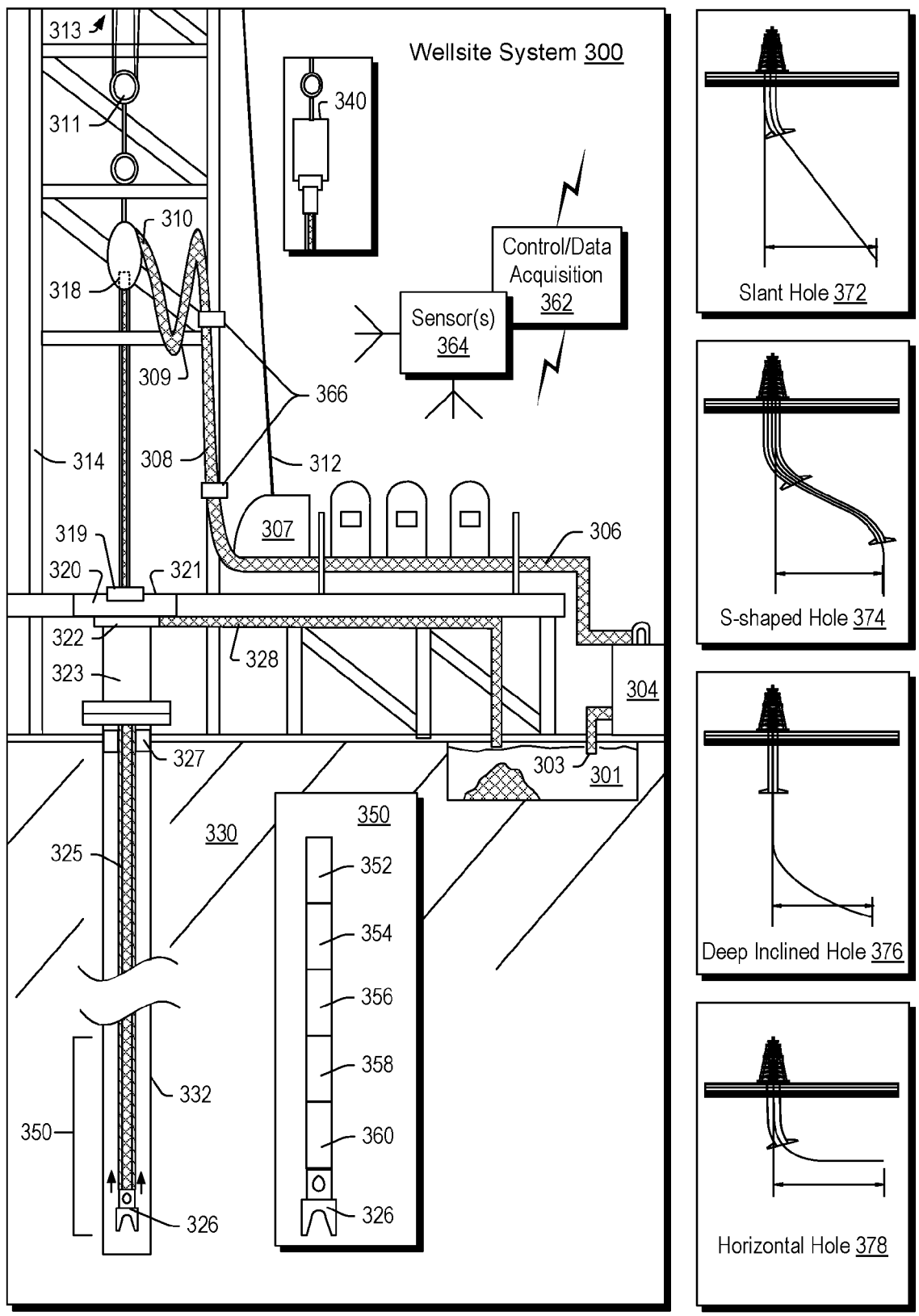
FIG. 3 illustrates an example of a drilling equipment and examples of borehole shapes.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud may be returned to the mud tank 301, for example, for recirculation with processing to remove cuttings and other material.

Cuttings may be defined to be small pieces of rock that break away due to the action of teeth of a drill bit. Characteristics of cuttings can include composition, size, shape, color, texture, hydrocarbon content and other properties. Cuttings may be collected and assessed as part of a mud logger system or workflow. Cuttings can be distinct from other material that may be carried by mud. For example, consider cavings that are rock debris that spalls as a result of borehole instability.

Material carried to surface by mud (e.g., drilling fluid) can be collected for one or more purposes. As to a collection process, consider collection of material at shakers of a mud system (e.g., a mud logger system, etc.) where material (e.g., cuttings and other material, if present) can be washed to remove fluid where residual fluid (e.g., mud, reservoir fluid, etc.) can be drained from a sample tray. Another technique is referred to as a flowline mud sample, which is a mud sample that exits directly out of a borehole from an annulus about drillpipe that is collected before passing through a shaker. Mud itself may be sampled and analyzed as a mud-out sample where the sample is taken after it has passed from the flowline and through shaker screens to remove large cuttings. This type of mud sample has experienced downhole pressures, temperatures and contamination that can cause degradation. Such a mud sample can be evaluated for possible treatments and compared, on a lagged time basis, with the corresponding mud-in sample (e.g., a sample of mud that flows into drillpipe and downhole for drill bit lubrication and/or mud motor rotation).

Material collected at shakers may be wet but void of surrounding fluid, and the material may be analyzed while wet and/or when dry. In various instances, material can be analyzed using digital photography that aims to capture representative material color with minimal interference from reflection. As an example, images may be acquired for material in relationship to depth (e.g., measured depth, etc.) where images can be acquired under different conditions (e.g., magnification, lighting, angles, etc.). Images may be acquired using one or more wavelengths of electromagnetic radiation. For example, consider UV, IR and/or visible wavelengths of EM radiation.

Images may be acquired using high-resolution digital microscopy (HRDM) with appropriate color resolution illumination and depth-of-field resolution, making the color, texture, and shape of drilled lithologies easier to identify. Rapid image acquisition can help wellsite geologists more accurately describe cuttings and quickly determine cuttings that may be suitable for one or more analysis techniques (e.g., X-ray diffraction, X-ray fluorescence, total organic carbon (TOC) quantification, etc.). Digital images can be stored to one or more data stores, whether local and/or remote. A data store may be accessed for making images of material readily accessible for review onsite as well as offsite by geologists, petrophysicists, basin modelers, etc. For example, consider a data store as being included in the system 200 of FIG. 2 and/or as being operatively coupled to the system 200 of FIG. 2. In such an example, the data store may provide one or more types of geo data, which can include digital images, assessments based on digital images, etc.

Referring again to the equipment of FIG. 3, processed mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry. Characteristics of the mud can be utilized to determine how pulses are transmitted (e.g., pulse shape, energy loss, transmission time, etc.).

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

An RSS can drill directionally where there is continuous rotation from surface equipment, which can alleviate the sliding of a steerable motor (e.g., a PDM). An RSS may be deployed when drilling directionally (e.g., deviated, horizontal, or extended-reach wells). An RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 354 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

During drilling operations, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings and/or cavings in the annulus.

As mentioned, digital microscopy can be utilized to assess material carried to surface by mud. Such material can be in the form of three-dimensional (3D) objects, which can be from cuttings when a drill bit crushes formation rock, from washout of formation rock, etc. A workflow may aim to determine lithology of material, where lithology can be defined generally as the macroscopic nature of the mineral content, grain size, texture and color of rocks. In such an example, lithostratigraphy may also be determined where lithostratigraphy can be defined generally as the study and correlation of strata to elucidate Earth history on the basis of lithology, or the nature of well log response, mineral content, grain size, texture, and color of rocks. As explained, a borehole may be drilled using one or more technologies and one or more techniques where the borehole passes through one or more layers of rock. Lithology and lithostratigraphy can aid drilling. For example, lithology and lithostratigraphy may aid in drill bit selection, drilling parameter selection, directional drilling, etc.

As explained, cuttings and/or cavings can cause issues such as sticking if build up occurs where sticking (e.g., stuck pipe) can lead to an increase in non-productive time (NPT). Characteristics of material in mud can also have an effect on energy expenditures, whether in moving mud or rotating a drill bit (e.g., via drillstring rotation, mud motor rotation, etc.). Characteristics of mud may be determined in part on the basis of material characteristics of material to be carried by the mud. For example, consider mud viscosity, mud type (e.g., oil-based, water-based, etc.), etc.

In digital microscopy of 3D objects, images captured are expected to be accurate in terms of colors and with suitable sharpness of the imaged 3D objects (e.g., rock cuttings, cavings and/or other objects). To ensure quality, a workflow can involve controlling settings of system hardware and software while aiming to minimize human errors (e.g., in installation, configuration, etc.). As an example, a method can provide for generating a calibrated digital microscopy system for imaging 3D objects. Such a method can involve verifying and confirming acceptable image quality through applying certain settings standards.

FIG. 4 shows an example of a digital microscopy system 400, an example of a method 410 and examples of digital imagery 480 at different levels of magnification as acquired using the digital microscopy system 400 along with an example plot of a CIELAB color space 482.

As shown in FIG. 4, the digital microscopy system 400 includes a stand 401 that can be supported by a base 402 (e.g., a platform) where arms 403 and 404 can extend outwardly from the stand 401 for mounting and positioning of a digital camera 405 and a light source 407. As shown, the digital camera 405 includes a lens 406 for forming microscopic images on an image plane of the digital camera 405. In the example of FIG. 4, the digital microscopy system 400 can include circuitry 408 that is operatively coupled to the digital camera 405 and/or the light source 407. As shown, the digital microscopy system 400 can include a display 409 that can render one or more graphical user interfaces (GUI) 470 and digital imagery 480. As an example, the circuitry 408 may provide for communication of signals, data, etc.

In the example of FIG. 4, a sample 450 is positioned on a sample tray 440 where the sample 450 is within a field of view (FOV) of the digital camera 405 such that digital imagery of the sample 450 can be rendered to a display, for example, consider the digital imagery 480 as being of the sample 450 and renderable to the display 409. As to the magnification values, these can represent digital zoom magnification values. As to optical zoom, it can introduce various factors such as, for example, depth of field (DOF) factors. In the example of FIG. 4, the digital microscopy system 400 includes features for digital zoom and can include features for optical zoom. For example, the lens 406 can be a fixed lens or an optical zoom lens. As an example, a lens may be a fixed focus lens. As an example, a fixed lens can provide a particular resolution and DOF as paired with a digital sensor. As to the sample 450, as explained, it is a three-dimensional sample; however, the sample 450 may have a relatively small height. For example, grains of material and/or agglomerates of material may be less than 1 cm in height such that digital imaging equipment with a relatively small DOF may be utilized. As explained, the digital microscopy system 400 can include a digital sensor that defines a sensor plane while another plane can be an object plane.

The digital microscopy system 400 of FIG. 4 may be a HRDM system. For example, consider resolution of 2,000,000 geometric pixels, 6,000,000 color pixels, picture size of 1,600 pixels by 1,200 pixels, suitable image format(s) (e.g., raw, compressed, etc.), zoom magnification of 20× to 200×, white balance automatic calibration, halogen lamp yellow light, 12 V, 100 W with a halogen lifetime of 1,000 h, and a footprint (H×L×W) 16.5×16.5×7 in (42×42×18 cm). Such a HRDM system can be portable and suitable for field use. For example, such a HRDM system may fit within a briefcase, a backpack, etc., such that it can be transported to a field site or field sites. While various drilling related operations are mentioned, such a HRDM system can be suitable for other field activities such as, for example, archeological activities, anthropological activities, etc., where digital images of 3D objects can be practically acquired and assessed to characterize such 3D objects.

As an example, a display can have a native resolution such as, for example, 1920 pixels by 1080 pixels (e.g., 2,073,600 total pixels, sometimes referred to as a 2 megapixel display) where pixel pitch is approximately 0.25 mm with a pixel density of approximately 40 pixels per centimeter. Such a display can be defined by an aspect ratio such as, for example, 16:1, and a maximum number of colors such as, for example, 1,677,216 colors (e.g., 24 bit color). As an example, consider a SAMSUNG T37F series display such as, for example, the model F22T37 display.

In the example digital imagery 480, the DOF can be the same for each enlargement of an original digital image (e.g., at each level of digital zoom) as the DOF is determined by equipment utilized to capture the original digital image. As an example, a digital image can be stored to a memory device as digital data where, for example, metadata may also be stored. In such an example, metadata can include one or more types of data regarding one or more settings, characteristics, etc., of image acquisition (e.g., image capture), environmental conditions, equipment specifications, time, etc. As an example, a digital file can be generated using the digital microscopy system 400 of FIG. 4 where such a digital file includes at least one spatial digital 2D image of at least one 3D object.

As to characteristics of a digital 2D image, a digital camera can include a sensor that provides an aspect ratio of 4:3 with a given number of pixels (e.g., 18 megapixels, etc.). As explained, a display may have a different aspect ratio such as, for example, 16:9. In such an example, a full sensor image may be cropped to provide an aspect ratio that matches a display or a display standard. As an example, the digital microscopy system 400 can provide for a live view of a sample where captured images can be rendered to a display in real-time optionally with appropriate cropping (e.g., to avoid distortion, etc.). In such an approach, depending on FOV and sample spread on a sample tray, a mechanism may provide for moving the sample tray such that portions of the sample can be selected viewed live.

As an example, a captured digital 2D image can be 18 megapixels where such an image can be cropped and rendered to a display (e.g., a 2 megapixel display, etc.) where circuitry allows for digital zooming by 2×, 3×, etc. In such an approach, the resolution of a cropped digital 2D image can dictate how much digital zooming can occur for rendering of the cropped digital 2D image to the display. In such an approach, the digital microscopy system 400 can provide a realistic rendering of the sample 450 (e.g., without distortion, with appropriate color, etc.) where at least one level of digital zoom can be defined and calibrated. Such an approach provides for accuracy in distance measurements of a sample, which may be at a scale that is less than 1 mm (e.g., of the order of microns, etc.). As an example, a scale may be rendered to a display where a sample can be measured according to the scale where the scale changes according to a level of zoom (e.g., digital and/or optical). As an example, a file may be stored to a memory device and/or transmitted via a network with appropriate calibration information such that a digital 2D image of a sample can be compared, examined, etc., at different sites, different workstations, etc.

As shown in FIG. 4, the method 410 includes a height block 411 for assessing height of the digital camera 405 (see dimension "d"), a light orientation block 412 for assessing orientation of the light sources 407 (see dimensions "a", "b" and "c"), a background color block 413 for assessing background color as may be a color of the base 402 or a sheet placed on the base 402, a lens aperture block 414 for assessing aperture of the lens 406, a light intensity block 415 for assessing light intensity of the light source 407, an exposure time block 416 for assessing exposure time of the digital camera 405, and an image compression block 417 for assessing one or more image compression techniques that may optionally be applied to digital images captured by the digital camera 405 (e.g., by the digital camera 405 and/or by the circuitry 408). As an example, the circuitry 408 may be involved in performing such a method with an aim to calibrate the digital microscopy system 400.

As an example, the digital microscopy system 400 of FIG. 4 can provide for aperture adjustment and/or focus fine tuning. As to focus fine tuning, it may be accomplished by adjustment to the distance d, for example, by moving the digital camera 405 and/or by moving the sample 450 and/or the sample tray 440 (e.g., consider utilizing a sample tray with a particular sample platform height to elevate or lower a sample). As an example, fine tuning may be at a scale of the order of a tenth of a millimeter. As an example, the method 410 can include a focus fine tuning block for fine tuning of focus, which can provide for appropriate resolution (see, e.g., resolution checking using a card, etc.).

In the example of FIG. 4, various 3D objects 450 are shown as being present on an upper surface of the base 402 of the digital microscopy system 400. The digital imagery 480 can be representative of 2D images of the 3D objects 450 where the 3D objects 450 are heterogeneous as involving different types of 3D objects; noting that one or more 3D objects may be present where multiple 3D objects may be heterogeneous and/or homogeneous.

As explained, lithology of a rock unit can be a description of physical characteristics that can include color, texture, grain size and composition where at least color, texture and grain size can be measured using a digital microscopy system. Lithology may refer to either a detailed description of these characteristics, or a summary of the gross physical character of a rock. Examples of lithologies in the second sense can include, for example, sandstone, slate, basalt, or limestone.

As shown in FIG. 4, the digital imagery 480 can provide for assessments as to grain size where a system is calibrated. Further, as indicated by the CIE color space plot 482, the digital imagery 480 can provide for assessments as to color where a system is calibrated. Yet further, the digital imagery 480 can provide for assessments as to texture utilizing one or more techniques.

Colorimetric techniques (e.g., a CIELAB plot) can be used to quantitatively measure absolute color and therefore color differences between lithologies. As shown in the example plot 482 of FIG. 4, however, some overlap may exist between lithologies; hence, color alone may be supplemented with one or more other measurements (e.g., grain size, shape and/or texture) to distinguish lithologies. For example, in the plot 482, some overlap exists as colors of shales, sands and carbonates. To distinguish amongst these, grain size and/or texture (e.g., and/or one or more other features) may be utilized. As explained, a digital microscopy system can be calibrated such that digital imagery acquired of 3D object(s) can provide for robust and accurate classification of 3D objects. As an example, a method can provide for generating a calibrated digital microscopy system, which may be an automated method or a semi-automated method (e.g., with some amount of manual interaction). Such a method can physically alter the digital microscopy system and/or alter circuitry thereof, for example, via execution of instructions by one or more integrated circuits (e.g., controller, processor, etc.).

As an example, a calibrated digital microscopy system can generate digital imagery that can be in the form of a digital file stored to a memory device or transmitted via a network where content of that digital file as to an imaged 3D object or 3D objects can be assessed, compared, etc., to actual 3D objects and/or other digital imagery of actual 3D objects with assurances as to measures being compared, for example, within some amount of error, which may be given as an error bound or error bounds as corresponding to a calibration method or methods. As an example, a comparison may utilize a particular display or displays where information such as metadata in a digital file can provide for determining how digital imagery is to be displayed and/or how to interpret what is displayed. As explained, metadata for digital imagery can include information as to sensor size, aspect ratio, cropping, scale, etc., which can be utilized when displaying digital imagery. As an example, metadata can include one or more types of calibration information such that an error bound or error bounds can be known for digital imagery of a digital file.

Figure 5:
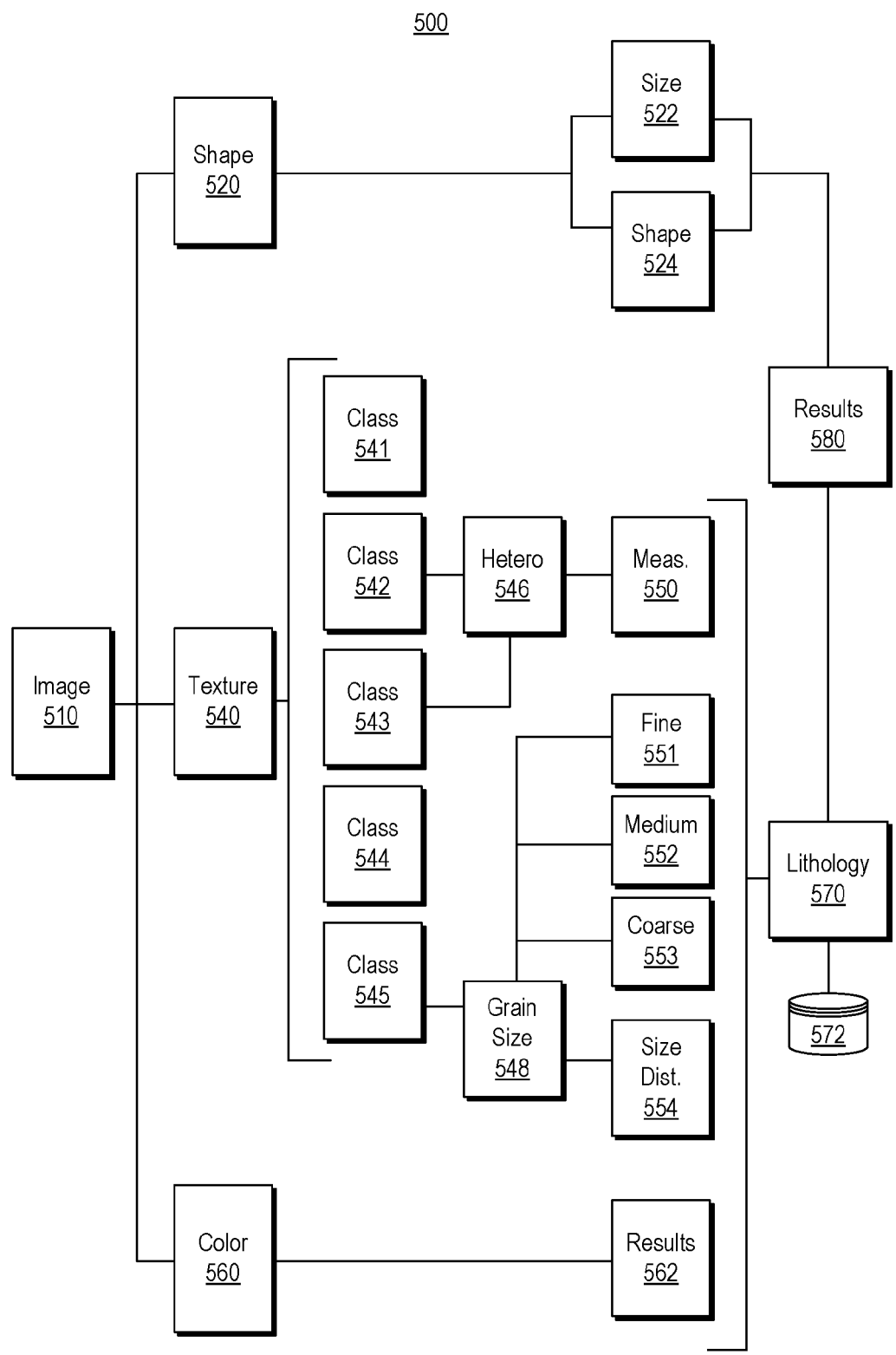
FIG. 5 illustrates an example of a workflow.

FIG. 5 shows an example of a workflow 500 that involves processing of a digital microscopy image 510 (e.g., digital imagery). As shown, the workflow 500 can include parallel processes for shape 520, texture 540 and color 560 that can ultimately be rejoined to provide results 580. As to the process for shape 520, size 522 and shape 524 can be assessed. As to the process for texture 540, one or more classes 541, 542, 543, 544 and 545 can be utilized where one or more of the classes provide for an assessment as to heterogeneity 546 and where one or more of the classes provide for an assessment as to grain size 548. As shown, the assessment as to heterogeneity 546 can result in a measurement 550 (e.g., along a spectrum from homogeneous to heterogeneous, etc.). As shown, the assessment as to grain size 548 can provide for determinations as to fine 551, medium 552 and coarse 553 content along with a size distribution 554. As to the process for color 560, it can generate appropriate results 562. In the example of FIG. 5, the processes for texture 540 and for color 560 can provide for generation of lithology 570, which may be assessed with respect to one or more sources of lithological data 572. In combination with size 522 and shape 524, the lithology 570 can be utilized to generate the results 580, which can include quantitative and/or qualitative information that characterizes one or more 3D objects presented in the digital microscopy image 510. As an example, the digital microscope image 510 may be stored as a digital file to a memory device and/or transmitted via a network where the digital file includes information regarding one or more of the blocks of the workflow 500. In such an example, the digital file can include metadata, for example, such as one or more types of metadata described with respect to FIG. 4.

As mentioned, the lithology of a rock unit is a description of its physical characteristics, which may be visible at an outcrop, in hand or core samples, or with low magnification microscopy. Physical characteristics can include color, texture, grain size and composition. Lithology may refer to either a detailed description of these characteristics, or a summary of the gross physical character of a rock. Examples of lithologies in a second sense include sandstone, slate, basalt, or limestone. As explained with respect to the workflow 500 of FIG. 5, the lithology 570 can be assessed using physical characteristics of the process for texture 540 and the process for color 560 where, for example, color and texture (e.g., including grain size) are physical characteristics of a lithology.

Lithological information can exist in outcrops (e.g., beds, laminae, heterogeneities, etc.), in cores depending on relative bed angles (e.g., beds, laminae, heterogeneities, etc.), in cuttings samples (e.g., single particle or multiple particles, etc.). For lithology classification on cuttings, the minimum representative element is a single cutting.

Classification of sediments and sedimentary rocks can utilize various characteristics, which can include grain size and color, amongst others. As to grain size, it may range from greater than 2 mm (e.g., granules, pebbles and cobbles) to less than 0.004 mm (e.g., clay-sized particles) and can be related to type or types of rocks (e.g., conglomerates, sandstones, siltstone, mudstone, shale claystone, etc.). Further, sorting may be assessed in a manner that depends on grain size (e.g., very poorly sorted for heterogeneous sizes to very well sorted for uniform size).

As to colors, consider materials such as feldspathic material that can be gray or light brown with light red to pinkish grains; anorthositic material that can be dark greenish-gray with clear to opaque grains of quartz and grains of other minerals; shale that can be light greenish gray, light gray, gray, dark gray to black and occasionally reddish; and sandstone that can be a variety of colors.

As an example, a sample may include limestone, which is a sedimentary rock that includes calcium carbonate, which effervesces in the presence of acid (e.g., acetic acid, hydrochloric acid, etc.). In some samples, parts of marine organisms may be observable such as, for example, fossil shells. Fossils that may be found in samples can include brachiopods, inoceramid clams, crinoid stems, rugose corals, bryozoans, fusulinids, amongst others.

As an example, a sample may be a fossil that is to be characterized by a digital microscopy system. In such an example, the fossil may be present by itself or long with other material (e.g., rock, other fossils, etc.). As an example, a sample may be a biological object, which may be from a human body or other animal body, a plant, etc. For example, consider a tooth, a bone or a tumor as being some types of biological objects that can be characterized by a digital microscopy system.

In object-based image analysis (OBIA), the "image object" is the central methodological element and as an object of investigation, it resides somewhere between application-driven plausibility and technology-driven detectability. In OBIA, a method can involve conjoining image segmentation with knowledge-based classification. In such an approach, segmentation can produce image regions, and these regions, once they are considered meaningful, can become image objects; in other words, an image object may be a defined using objective and/or subjective criteria where, for example, a human or humans may be involved in review (e.g., refereed by a human expert). In a digital image of pixels of a 3D object, a single pixel is generally insufficient to be represented as a 3D object; however, multiple pixels can, collectively, represent a 3D object.

As an example, a workflow can involve performing segmentation as to regions and performing classification using one or more of the regions; noting that it can be rather complicated to extract observable lithology physical characteristics (e.g., color, texture and grain size) from an entire image.

As an example, a workflow can involve four processes for generating results: generation of calibrated digital images of one or more 3D objects, 3D object segmentation, 3D object measurements, and 3D object classification.

In such an example, the workflow may include use of one or more machine learning (ML) models. For example, consider a classification ML model such as a clustering model (e.g., k-means clustering, etc.) or a neural network classification model and/or prediction model. In the field of machine learning, data quantity and data quality present obstacles to the generation of robust and accurate ML models. In the workflow 500 of FIG. 5, again, the workflow 500 commences with the digital microscopy image 510. With or without utilization of ML models, consistency and quality of input is paramount to reliable output (e.g., results).

FIG. 6 shows example GUIs 610 and 620 as to some examples of data that may be acquired and/or generated. As mentioned, various types of data can be acquired, which may be or include field data, laboratory data, simulation data, etc. In the GUIs 610 and 620, various types of data can be received using a framework such as the TECHLOG framework. In the GUI 610, data include well log data such as bulk density (RHOB), gamma ray (GR), photo electric factor (PEF), and lithology versus measured depth (MD). In the GUI 620, data include RHOB, neutron porosity (BPHI), bulk density bottom (ROBB), phase shift resistivity 40 inch spacing at 2 MH (P40H ohm·m), imagery data (e.g., borehole images), and GR versus total vertical depth (TVD) minus the elevation above mean sea level of the depth of the reference point of a well (TVDSS).

As explained, a framework such as the TECHLOG framework can dynamically incorporate data as it is streamed directly from a wellsite for real-time processing and instantaneous analysis as a well is drilled, which can aid in decision making during operations. As mentioned, such a framework can also access one or more other types of data such as laboratory data, stored data, etc.

As to the lithology log in the GUI 610, which is shown as lithology versus measure depth (MD), such a log may be generated using a workflow such as the workflow 500 of FIG. 5. For example, consider using a system such as the system 400 for acquisition of digital images of material carried by mud to surface where the results 580 can include the lithology 570 based at least in part on digital microscopy images of 3D objects. As shown in the GUI 620, other imagery can include borehole imagery that are actual images acquired downhole, which may be presented with respect to measured depth (MD). As an example, one or more control instructions may be issued using a framework such as the TECHLOG framework and/or another framework that can determine lithology. As an example, the workflow 500 of FIG. 5 may be part of a system that is integrated into and/or operatively coupled to the TECHLOG framework and accessible via a system such as the system 100 of FIG. 1.

Referring again to the method 410 of FIG. 4, such a method can provide for improved consistency and quality of digital microscopy images. With such a method, acquired digital microscopy images may be utilized for one or more purposes, which can include assessment (e.g., during drilling, etc.), training data for training one or more ML models, testing data for testing one or more ML models, etc.

Referring again to the system 400, the lens 406 can be a relatively compact lens attached to the high-resolution digital camera 405 (e.g., up to 20 MP or more) where the circuitry 408 can include a computing system, which may be a portable computing system (e.g., a notebook computer, etc.). As an example, the light source 407 can be a white LED illuminator with a calibrated color temperature (e.g., 6500K) and a relatively high color rendering index (e.g., CRI>90%). The circuitry 408 can include processor-executable instructions stored in a storage device that is accessible to a processor such that the processor can access and execute the instructions to instruct the system 400 to perform one or more methods. As an example, a method can be a calibration method and/or an acquisition method. For example, consider a method that can automatically call for image acquisition as part of a calibration process where one or more conditions may be changed as part of the calibration process until image acquisition consistency and quality are achieved. Such a method may be a human-in-the-loop (HITL) method, for example, where interaction is via a graphical user interface rendered to a display and/or via physical contact with one or more features of the system 400 (e.g., to rise/lower the digital camera 405, to rise/lower/orient the light source 407, etc.), to place/remove an engineered object (EO) on the base 402, etc.

In the system 400, the digital camera 405 and its lens 406 can have a field of view (FOV). For example, the digital camera 405 and the lens 406 can be selected to provide a relatively large FOV (e.g., 50 mm×30 mm). Once these hardware components are selected, the FOV is dependent on the distance between the digital camera 405 and the base 402 (see the dimension "d"). Whenever the camera height is adjusted, a distance calibration is to be performed to return the FOV dimensions to the system 400. As an example, a calibration card (e.g., a flat card with a checkerboard pattern) that includes a chess-like patterns of a certain numbers of columns and rows (e.g., 10×6) of known dimensions (e.g., 20.59 mm diagonally) can be appropriately positioned within a FOV such that the circuitry 408 can receive digital data for detection of the patterns for calibration of the distance information (e.g., the dimension "d"). The appropriate FOV can then be checked using a digital ruler of the circuitry 408 once the distance measurement is calibrated.

As an example, another method to verify the FOV of the system 400 is to find the calibration value of acquired images. This value can be saved as image metadata. In such an example, a calibration value of 0.0113 corresponds to a horizontal field of view of 55 mm; as the camera pixel number is 4912 and the pixel size is 1.25 µm. Hence, this calibration value indicates an appropriate camera position (height). As an example, a method for generating a calibrated system can set, for this calibration value, an acceptable range for an image to be 0.0111-0.0115 (e.g., corresponding to fields of view of 54 mm×31 mm and 56 mm×32 mm respectively) to ensure that the camera height is set appropriately.

As to the 3D nature of a 3D object, the light source 407 can cast shadows depending on its orientation with respect to the 3D object (or 3D objects). To optimize the illumination configuration, the system 400 can be configured in a way that the shadow of a 3D object is shown clearly in an image. For purposes of calibration, a method can utilized a 3D engineered object (EO). For example, consider a 3D printed cuboid of 50 mm×10 mm×14 mm for metric control. In such an example, the EO can be appropriately placed on the base 402 to show a shadow with respect to illumination from the light source 407. In such an approach, the size of the shadow can be determined to be around 3.5 mm to 4.5 mm so that when, for example, imaging cuttings, their shadows are shown in the image. This particular metric is mainly affected by the orientation of the light source 407.

As to color calibration, it is a process that returns an appropriate exposure level and white balance to the system 400. For example, consider an 18% gray card that can be placed in view of the digital camera 405. In such an example, auto white balance and auto exposure functions of the digital camera 405 and/or the circuitry 408 can be enabled while monitoring color histogram(s). Such a process can be completed once R, G, B channels are overlapping and position in the middle of the histogram (e.g., appropriate RGB values of an 18% gray color). For the system 400, consider R gain as 25, G gain as 0, B gain as 29, and the auto exposure level at 16. These values can be different where a different imaging system or different combinations of the system components are utilized. As an example, information of R, G, B gains and exposure level of an image may also be retrieved from metadata (e.g., gains and/or other information may be stored as metadata to a digital file that includes digital imagery).

As to image quality control specifications, consider color accuracy as a factor to control image quality. Color accuracy defines how well an imaging system can reproduce colors according to a particular standard and shades of an imaged object(s). There are several factors that can affect the color accuracy of a system such as temperature and intensity of the lighting, the type of lenses, the type of camera, etc.

In various instances, a manual approach can involve utilization of a Munsell color chart. For example, a user may refer to a Munsell color chart to determine a color match between a sample and a color of the Munsell color chart, which may have a color-to-color resolution of $\Delta E=1$, though a human may not have an ability to achieve such a fine level of resolution. As an example, the digital microscopy system 400 of FIG. 4 can automatically determine a color, which may be at a color resolution that is less than $\Delta E=10$ where the color may be specified, for example, to be located on a Munsell color chart, etc. As an example, a measurement reference may be provided by an institution, a scientific body, etc. (e.g., National Institute of Standards and Technology (NIST), etc.), as in the field of metrology.

One or more types of color models may be utilized where a color depth can be referenced. For example, 8-bit color and 24-bit color can be the same where, in an RGB color space, 8-bits refers to each R, G and B (e.g., subpixel), while 24-bit is a sum of the three 8-bit channels (e.g., 3×8=24). Standards can include, for example, monochrome (e.g., 1-bit) to 4K (e.g., 12-bit color, which provides 4096 colors), etc.

As to color models, RGB can be mapped to a cube. For example, a horizontal x-axis can be a red axis (R) for red values, a y-axis can be a blue axis (B) for blue values, and a z-axis can be a green axis (G) for green values. The origin, of such a cube (e.g., 0, 0, 0) can be black and an opposing point can be white (e.g., 1, 1, 1).

Another type of color model is the Y'UV model, which defines a color space in terms of one luma component (Y') and two chrominance components, called U (blue projection) and V (red projection) respectively. The Y'UV color model is used in the PAL composite color video (excluding PAL-N) standard.

Yet another type of color model is the HSV color model. The RGB color model can define a color as percentages of red, green, and blue hues (e.g., as mixed together) while the HSV color model can define color with respect to hue (H), saturation (S), and value (V). For the HSV color model, as hue varies from 0 to 1.0, corresponding colors vary from red through yellow, green, cyan, blue, magenta, and back to red (e.g., red values exist at both at 0 and 1.0); as saturation varies from 0 to 1.0, corresponding colors (hues) vary from unsaturated (e.g., shades of gray) to fully saturated (e.g., no white component); and as value, or brightness, varies from 0 to 1.0, corresponding colors become increasingly brighter.

Saturation may be described as, for example, representing purity of a color where colors with the highest saturation may have the highest values (e.g., represented as white in terms of saturation) and where mixtures of colors are represented as shades of gray (e.g., cyans, greens, and yellow shades are mixtures of true colors). As an example, saturation may be described as representing the "colorfulness" of a stimulus relative to its own brightness; where "colorfulness" is an attribute of a visual sensation according to which the perceived color of an area appears to be more or less chromatic and where "brightness" is an attribute of a visual sensation according to which an area appears to emit more or less light.

Chroma can be defined as being boosted when chroma is greater than 100%. Chroma may be affected by lens quality (e.g., flare light in poor lenses decreases it) and signal processing. Various digital cameras and RAW converters have adjustments for chroma, which may be labelled as saturation. Chroma is strongly affected by image processing during RAW conversion (particularly by a color correction matrix (CCM)). Chroma can be adjusted using circuitry such as software implemented by hardware. In digital imagery for artistic purposes, a digital camera may have boosted chroma (e.g., saturation greater than 100%) to make digital images more vivid (e.g., consider 110-120% in compact digital cameras); however, but boosted chroma can cause a loss of detail in highly saturated objects. In digital photography, saturation over 120% may be regarded as excessive. In various examples herein, saturation can exceed 100%, which may be referred to as boosted chroma, noting that by definition chroma is generally limited to 100%. As an example, where saturation in a digital image exceeds 100%, saturation may be referred to as being over saturated. As an example, limits may be set such that a desired level of saturation is between approximately 90% and approximately 110%.

As to the CIELAB color space, also referred to as L*a*b*, it is a color space defined by the International Commission on Illumination (abbreviated CIE) in 1976 that expresses color as three values: L* for perceptual lightness, and a* and b* for the four unique colors of human vision: red, green, blue, and yellow. CIELAB was intended as a perceptually uniform space, where a given numerical change corresponds to a similar perceived change in color. The CIELAB color space is a device-independent, "standard observer" color model. The colors it defines are not relative to any particular device such as a computer monitor or a printer, but instead relate to the CIE standard observer which is an averaging of the results of color matching experiments under laboratory conditions.

The CIELAB color space is 3D and covers the entire range of human color perception, or gamut. It is based on the opponent color model of human vision, where red and green form an opponent pair, and blue and yellow form an opponent pair. The lightness value, L*, also referred to as "Lstar," defines black at 0 and white at 100. The a* axis is relative to the green-red opponent colors, with negative values toward green and positive values toward red. The b* axis represents the blue-yellow opponents, with negative numbers toward blue and positive toward yellow.

The a* and b* axes are unbounded, and depending on the reference white, they can exceed ±150 to cover the human gamut. Nevertheless, various implementations often clamp these values for practical reasons. For instance, if integer math is being used it is common to clamp a* and b* in the range of −128 to 127. As indicated, CIELAB is calculated relative to a reference white, for which the CIE recommends the use of CIE Standard Illuminant D65. D65 is used in various industries and applications.

The lightness value, L* in CIELAB is calculated using the cube root of the relative luminance with an offset near black. This results in an effective power curve with an exponent of approximately 0.43 which represents the human eye's response to light under daylight (photopic) conditions.

As an example, a method can include accessing one or more resources as to color models (e.g., as a plug-in, external executable code, etc.). For example, consider a method that includes instructions to access an algorithm of a package, a computing environment, etc., such as, for example, the MATLAB computing environment (marketed by MathWorks, Inc., Natick, MA). The MATLAB computing environment includes an image processing toolbox, for example, with algorithms for color space (e.g., color model) conversions, transforms, etc. As an example, the MATLAB computing environment includes functions "rgb2hsv" and "hsv2rgb" to convert images between the RGB and HSV color spaces as well as "rgb2lab" and "lab2rgb" to convert images between the RGB and CIELAB color spaces.

Again, for the RGB color space, each color is defined by its red, green and blue values. The most effective method to check a system's color accuracy is to take an image of a standard color reference chart consisting of certain numbers of color patches of specific RGB values, detect the colors captured and compare to the known RGB values of the color patches on the chart. The distance between the color reproduced by the system and the reference color can be quantified by ΔE00, a color difference equation (e.g., also ΔE or ΔEoo). Lower ΔE00 indicates greater accuracy.

While ΔE00 is given an example of a metric, the difference or distance between two colors can be a metric of interest in color science that may be determined using one or more formulations. Quantification of difference can include formulations that make use of the Euclidean distance in a device-independent color space. The CIELAB approach can utilize various adjustments such as a hue rotation term (RT), to deal with the blue region (hue angles in the neighborhood of 275°), compensation for neutral colors (the primed values in the L*C*h differences), compensation for lightness (SL), compensation for chroma (SC) and compensation for hue (SH).

As to reference color charts or targets, various types are available. For example, consider the Rez Checker Nano Target (Image Science Associates, LLC, Williamson, New York). The Rez Checker Nano Target is a miniaturized target for assessing color, tone, and white balance in addition to measuring resolution and spatial frequency response (SFR) or modulation transfer function (MTF) for digital cameras/scanners using edge gradient analysis of ISO 12233 and ISO 16067. The Rez Checker Nano Target can have a relatively accurate thickness, which as explained, may be approximately equal to the thickness of a sample tray.

Target patches can be made in cooperation with pigmented color paints where, at center, there can be 12 spectrally neutral gray patches for assessing correct exposure and white balance. Slanted edges can be used to reliably measure SFR or MTF out to 3000 dot-per-inch or 60 cycles/mm. Five line visual hyperbolic wedges can also be included to aid in visual assessment of limiting resolution to 850 dpi.

Patches can be mounted on aircraft grade anodized aluminum and set below a top surface to help protect them from damage. Patch sizes can be ⅛"×⅛" (3.175 mm×3.175 mm) while overall size can be 1.0" (25.4 mm) high×⅞" (22.2 mm) wide×0.060" (e.g., approximately 1.5 mm) thick and are available with either gloss or matte center gray patches. Colored patches on the perimeter are matte finish. Because these targets are hand cut and assembled, very minor patch misalignments may occur though they do not affect the target's utility.

Gloss gray patches can have an extended dynamic range (density ~2.4) and can be suitable for measuring digital camera imager noise. Specular reflections from the gloss surface may occur for illumination geometries less than 450/00 when used without crossed polarizers.

Matte gray patches can have a lower dynamic range (density ~1.6) but can be more suited to narrow illumination geometries such as those used in endoscopic imaging or with direct on-camera flash units. Because the matte surface can be interpreted as imager noise, it is not recommend using matte gray patch targets for evaluating imager noise in high magnification applications.

A target can be selected with a compatible size for a system's FOV. As indicated, a target can include a number of color patches such as, for example, 30 color patches. An image of the target can be analyzed to return an average ΔE00 value calculated in the CIELAB color space (L*a*b*) based on the color deviation of the 30 colors displayed by the system versus the reference. The reference values can be measured using a traceable NIST measurement or a calibrated spectrophotometer for ultimate color accuracy.

As explained, a method can include focus fine tuning, which may be accomplished through use of a card such as a resolution checking card (e.g., the Rez Checker Nano Target). As an example, a sample tray can include a platform height that is approximately equal to the height of a card such as a resolution checking card such that once the card is removed and the sample tray positioned within a FOV of a digital camera, one or more adjustments that depend on distance (see, e.g., the distance d) can be maintained. As explained, one or more techniques can be utilized to assess resolution that can depend on, for example, utilization of a resolution checking card.

In various trials, an instance of the system 400 using a digital camera (based on Bayer filters), the lowest ΔE00 value achieved was around 5. Thus, an acceptable range of ΔE00 can be determined to be within a range of that value, for example, consider calibration being based on achieving a value of less than 5.5; noting that the smallest perceptible difference corresponds roughly to ΔE00=1. As explained, information as to a difference value for a calibrated digital microscopy system may be stored to a digital file for digital imagery such that a user and/or a machine may make an assessment, a comparison, etc. As explained, a human may resort to a Munsell chart to make a comparison to a digital image of a 3D object rendered to a display where the display is calibrated as to color and/or where color information may be rendered to the display (e.g., numeric values, etc.) to assist with the comparison. In such an example, an error bound or error bounds may be indicated such that the human has some level of confidence in making the comparison and a result thereof.

As to saturation, as mentioned, it describes color intensity and purity. Saturation can be quantified by mean camera chroma (%), calculated by dividing the average chroma of camera colors by the average chroma of an ideal color checker colors. Such a value may be returned via appropriate image analysis software after analyzing an image of a color target. Saturation of more than 120% can be considered overly boosted, which may result in loss of details.

To avoid excessive color saturation and potential loss of details, a target average camera chroma (saturation) value to be achieved may be set to be around 100%. Hence, an acceptable range can be set to be within 100%+10% (90%-110%).

As to sharpness, it indicates how well an imaging system can reproduce details of an imaged object or objects. Sharpness is an evaluation of overall image performance, which can include lens (optical design), digital sensor, image processing pipeline, lens focus, etc. As an example, a calibration method can examine boundaries between different color zones; the blurrier the boundaries, the lower sharpness of the system.

To measure sharpness, bar patterns can be used to estimate the spatial frequency (line pair per mm) when the bar patterns are no longer distinctively visible. As explained, a slanted-edge approach may be utilized to measure sharpness. For example, the aforementioned Rez Checker Nano Target includes a slanted-edge area (see, e.g., the grayscale image 732 of FIG. 7).

As an example, analysis of a slanted-edge image can be performed using a computing system that can return an MTF curve. Various metrics may be derived from an MTF curve such as, for example, MTF10, MTF30 and MTF50 as the spatial frequencies where MTF is 10%, 30% or 50% of the zero frequency respectively. As an example, MTF50 may be utilized as a parameter to define sharpness of a system. For example, a target MTF50 value of about 103 cycles/mm can be achieved with a relatively large horizontal field of view of 50 mm. As an example, an acceptable range may be set to be from 80-110 cycles/mm.

As an example, a MTF50 may at times overestimate a system sharpness; noting that using a resolution checking card (e.g., a resolution target), a system such as the digital microscopy system 400 of FIG. 4 can distinguish a feature with 34 cycles/mm (cy/mm) with reasonable contrast (e.g., C=0.2). MTF50 tends to be a suitable metric to provide automated evaluation of sharpness, for example, without resorting to manual human visual estimation. As an example, the digital microscopy system 400 of FIG. 4 can utilize MTF50 in an automated method for improving system sharpness.

Figure 7:
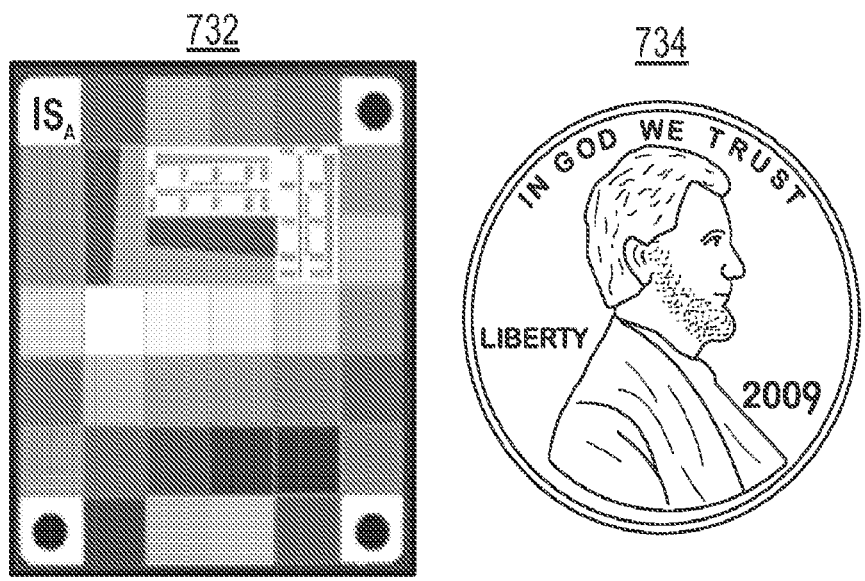
FIG. 7 illustrates examples of tables of values and examples of grayscale images.

FIG. 7 shows a series of tables 710, 720 and 730 of values, which include target values and ranges of values (e.g., limits, etc.), that may be utilized in a calibration process to generate calibrated equipment such as, for example, a calibrated instance of the system 400 of FIG. 4. As shown, the table 710 includes FOV values, the table 720 includes shadow size values and the table 730 shows color error values, saturation (chroma) values and MTF50 values. The information in the tables 710, 720 and 730 can be provided in one or more data structures stored in memory of a storage device where a computing system can access the one or more data structures for such values to generate a calibrated digital microscopy system for imaging 3D objects.

FIG. 7 also shows a grayscale image 732 of the Rez Checker Nano Target, referred to as a card, next to a grayscale image 734 of a US one-cent coin (penny). As explained, such a card can be utilized for various calibration tasks. As shown in the grayscale image 732, the card includes a slanted-edge area with a slanted-edge in one direction and a slanted-edge in another direction, a number of squares that differ in color and a series of squares that vary from white to black.

As an example, various image control parameters can be computed using a computing system and a framework or frameworks. For example, consider one or more of the aforementioned MATLAB framework, which includes an imaging toolbox, the IMATEST framework for color and/or sharpness (Imatest LLC, Boulder, Colorado), various PYTHON color libraries, etc. For sake of consistency, MTF evaluation can be based on the ISO standard: 12233: Resolution and Spatial Frequency response.

As an example, a selection of a region of interest (ROI) may be performed automatically (e.g., based in part on segmentation) and/or manually by an operator.

As an example, a process may be automated at least in part where a control chart (e.g., the Rez Checker card for type, orientation, and position), and imagining system parameters (e.g., FOV, WD) are defined and controlled systematically by calibrating the FOV using a checkerboard card. As an example, the base 402 of the system 400 can include a defined standard marked position for the Rez Checker card.

As explained with respect to FIG. 4, the method 410 can be implemented for calibrating the digital microscopy system 400 to generate a calibrated instance of the system 400. As explained, a calibrated system can output calibrated digital images, which may be in the form of a digital file with metadata where such metadata can include information germane to the calibration (e.g., specified parameter values, bounds, etc.). Such an approach can facilitate sharing and comparing digital imagery (e.g., images to images, images to actual samples, images to standards, etc.). Such an approach can provide for more robust and confident classifications and decision making, which may be for modeling a subsurface environment, performing field operations for a subsurface environment, etc.

As an example, various components of the system 400 can be tested to determine optimized settings that satisfy criteria such as criteria in the tables 710, 720 and 730 of FIG. 7.

Referring to the camera height block 411, camera height does not affect the image's color accuracy and sharpness; however, it changes the FOV of the system 400, which is reflected in the calibration value. When the digital camera 405 is fixed at 261 mm to 266 mm (see dimension "d") from the base 402, the FOV is in its acceptance range. At 266 mm, the FOV meets the target of 55 mm×31 mm. Hence, the digital camera 405 can be fixed at 266 mm from the base 402.

Referring to the light orientation block 412, the light's configurations include the length of the arm (see dimension "a"), the height of the lower edge (see dimension "b") and the height of the upper edge (see dimension "c"). The orientation of the light source 407 affects shadow quality along with color accuracy and saturation of images. The ranges for these three parameters to maintain the shadow size and image quality are as below: a=70 mm to 80 mm, b=80 mm to 95 mm, and c=160 mm to 180 mm. For example, consider a=75 mm, b=90 mm, and c=160 mm.

As to the background color 413, the color checker card can be placed on different background colors; however, most of the background does not affect the image quality, especially the color accuracy ΔE00 except for bright colored (e.g., white) and glossy surfaces. Due to the availability of the lining materials, quality control images of the color check on the base 402 (gray) were acquired with cutting(s) images in a sample tray lined with magenta tape.

As to the lens aperture block 414, as mentioned, auto exposure level of the system 400 was at 16. At this exposure level, different apertures of 1.2, 2, 4, 8, 22 were examined, where with the aperture of 4, the system 400 returned acceptable ΔE00, saturation, and sharpness. Where the aperture was below 4, the images were overexposed while, above 4, the images were underexposed. Hence, for the trial system 400, the aperture was set at 4.

As to the light intensity block 415, intensity of the light source 407 is adjustable where at the maximum intensity, the images satisfied the criteria. At lesser intensity, dimmer than the maximum, image quality deteriorated due to lack of brightness.

As to the exposure level or exposure time block 416, when fixing the aperture at 4, the exposure time can be at either 14 ms or 16 ms to obtain acceptable image quality. As an example, an exposure time may be controlled via one or more types of circuitry, for example, consider digital camera circuitry and/or other circuitry of a controller operatively coupled to a digital camera.

As to the image compression block 417, options for export of digital images include PNG, compressed PNG, JPEG, and compressed JPEG. In trials, each of these four options provided acceptable quality. Noting that PNG provided the largest file size. Image compression does impact a quality control process, noting that PNG can provide suitable (lossless) image quality.

FIG. 8 shows example tables 810 and 820 where the table 810 includes optimized setting values for the system 400 of FIG. 4 and where the table 820 includes various aspects of calibration along with methods that can be utilized and frequency of performing such methods. As shown in the table 810, a configuration file can include gain values for a color or colors (e.g., R, G, B, etc.). Such information may be stored to a digital file, optionally as metadata along with digital imagery. As an example, the optimized settings of the table 810 can be stored to a digital file, optionally as metadata to a digital file that include digital imagery acquired using a system configured according to the settings of the table 810. In the example of FIG. 8, the light orientation is given via one or more values, which can be distances in a three-dimensional coordinate system (e.g., a Cartesian coordinate system or another type of coordinate system). Such values can provide for setting a distance to a base (e.g., a sample tray, a card, etc.) as well as for orienting a plane of a light source with respect to a plane of a base (e.g., a sample tray, a card, etc.).

Figure 9:
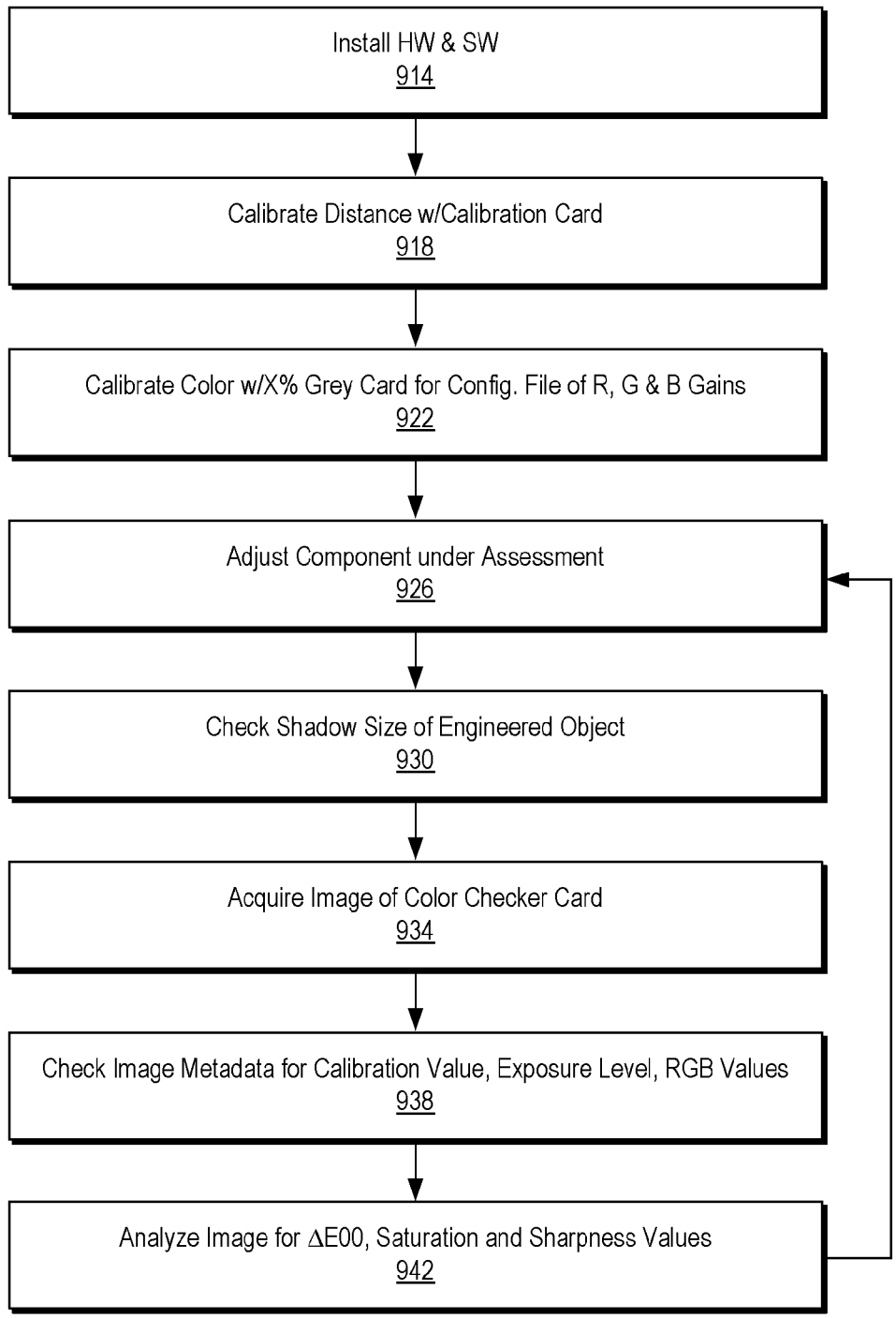
FIG. 9 illustrates an example of a method.

FIG. 9 shows an example of a method 900 that includes an installation block 914 for installing hardware and software, a calibration block 918 for calibrating distance with a calibration card, a calibration block 922 for calibrating color with a grey card for generating a configuration file (e.g., for R, G, and B gains), an adjustment block 926 for adjusting a component (or components) under assessment, a check block 930 for checking shadow size of an engineered object (EO), an acquisition block 934 for acquiring an image of a color checker card, a check block 938 for checking image metadata for calibration value, exposure level and RGB values, and an analysis block 942 for analyzing DE00, saturation and sharpness values. As shown in the example of FIG. 9, the method 900 can return to the adjustment block 926 in an iterative manner depending on output of the analysis block 942.

As explained, a method such as the method 410 of FIG. 4 or the method 900 of FIG. 9 can provide for generating a calibrated digital microscopy system for imaging 3D objects. Such an optimization procedure generates system configurations that give acceptable performance that satisfy predefined criteria. As explained, in various instances, optimal values were determined where deviation in one direction or both directions results in detrimental effects that can be quantified. Such effects can be measured (e.g., quantified) and utilized as part of a control scheme to manually, semi-automatically or automatically generate a calibrated digital microscopy system for 3D objects. As an example, relationships between settings and effects can be automatically determined and/or pre-programmed in a control scheme. Such relationships between image quality and modifications of the hardware and/or software settings can be part of a workflow where decisions are made and optionally one or more loops implemented to arrive at an optimally calibrated digital microscopy system. For example, if a quality control criterion is not satisfied, one or more components of a digital microscopy system for 3D object can be adjusted for verification and modification to achieve a desired level of image quality.

Figure 10:
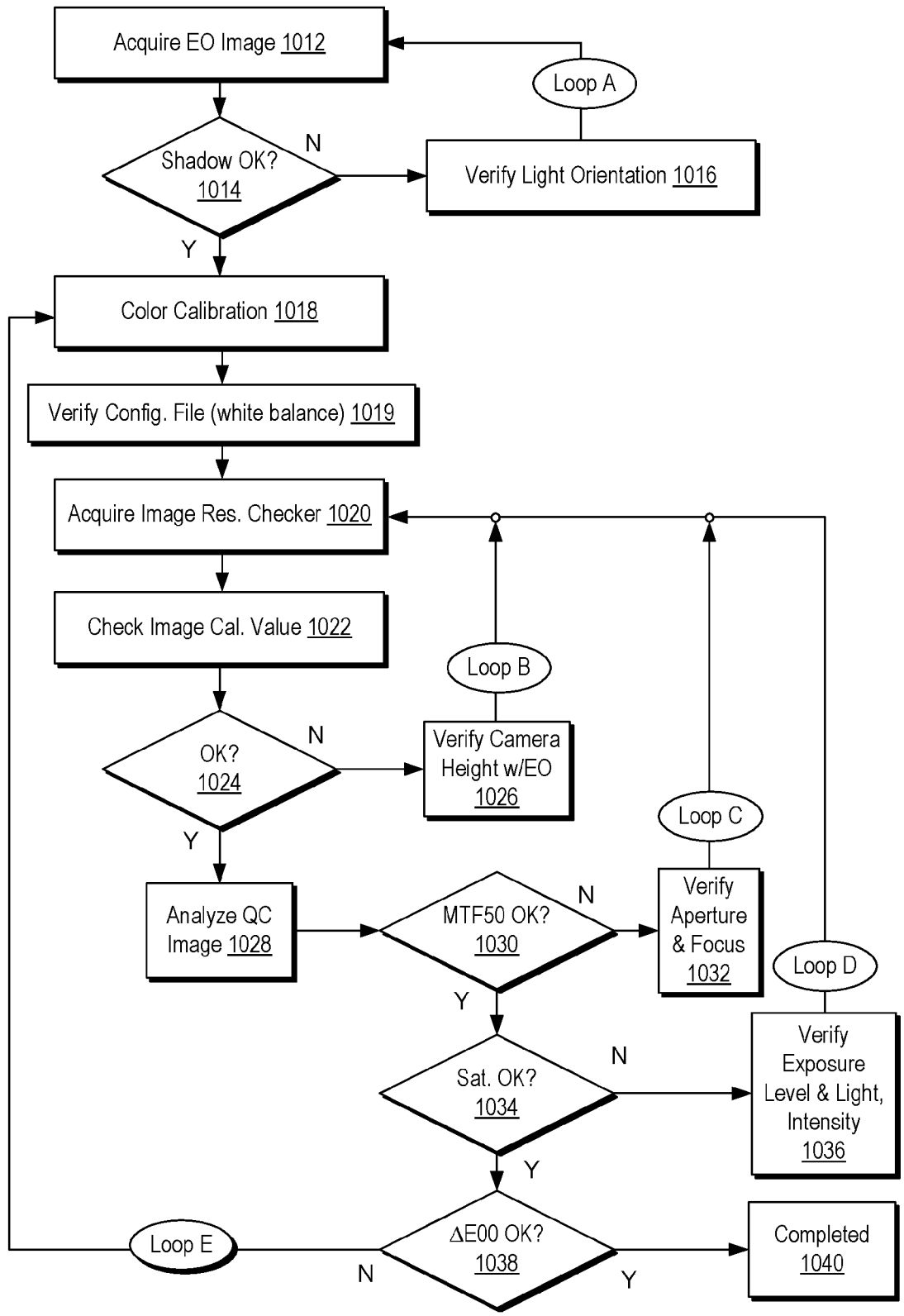
FIG. 10 illustrates an example of a method.

FIG. 10 shows an example of a method 1000 that includes an acquisition block 1012 for acquiring an image of an engineering object (EO), a decision block 1014 for deciding whether a shadow cast by the EO in the image is acceptable, a color calibration block 1018 for performing a color calibration, a verification block 1019 for verifying a configuration file (e.g., as to white balance, gains, etc.), an acquisition block 1020 for acquiring an image of a resolution checker card (e.g., Rez Checker card, etc.), a check block 1022 for checking an image calibration value, a decision block 1024 for deciding whether the image calibration value is acceptable, an analysis block 1028 for analyzing a quality control image, a decision block 1030 for deciding whether the quality is acceptable (e.g., MTF50, etc.), a decision block 1034 for deciding whether saturation is acceptable, a decision block 1038 for deciding whether color error is acceptable (e.g., ΔE00, etc.), and a completion block 1040 for completing the calibration of the method 1000.

The foregoing description of the method 1000 pertains to the decision blocks 1014, 1025, 1030, 1034 and 1038 following their respective "yes" branches. For example, where each of the decision blocks 1014, 1025, 1030, 1034 and 1038 determines that a predetermined level, range, etc., is met, the method 1000 can lead to the completion block 1040. However, where one or more "no" decisions are made (e.g., "no" branches), the method 1000 can perform one or more loops that can act to iteratively improve calibration of a digital microscopy system for 3D objects.

As shown in the example of FIG. 10, the method 1000 can include loops A, B, C, D and E. As to the loop A, if the decision block 1014 decides that the shadow in the acquired EO image is not acceptable (e.g., in size, shape, etc.), then the method 1000 can proceed to a verification block 1016 for verifying or adjusting light orientation (e.g., adjusting a light source, etc.) and continue to the acquisition block 1012. As to the loop B, if the decision block 1024 decides that the image calibration value is not acceptable, then the method 1000 can proceed to a verification block 1026 for verifying or adjusting camera height with respect to a base or EO (e.g., adjusting a camera, etc.) and continue to the acquisition block 1020. As to the loop C, if the decision block 1030 decides that the image quality is not acceptable, then the method 1000 can proceed to a verification block 1032 for verifying or adjusting lens aperture and/or lens focus (e.g., adjusting a camera lens, adjusting a distance, etc., which can impact sharpness) and continue to the acquisition block 1020. As to the loop D, if the decision block 1034 decides that saturation is not acceptable, then the method 1000 can proceed to a verification block 1036 for verifying or adjusting one or more of exposure level and light intensity and continue to the acquisition block 1020. As to the loop E, if the decision block 1038 decides that the error (e.g., ΔE00, etc.) is not acceptable, then the method 1000 can proceed to the color calibration block 1018 for performing a color calibration.

As explained, a metric such as ΔE00 can be utilized to assess color. In the example of FIG. 10, the method 1000 provides for assessing color last, which can depend on various other factors such that if a color metric is not met the method 1000 can reassess one or more of such factors before once again assessing color. As explained, sharpness may be impacted by fewer factors than color such that a sharpness assessment can be performed prior to a color assessment.

As to a light source, a method may be limited as to what can be adjusted. For example, a light source may be of a fixed intensity and a fixed color temperature such that adjustments are limited to spatial adjustments (e.g., distance, orientation, etc.). In such an approach, by limiting what can be adjusted, the number of adjustable factors may be reduced, which may, in turn, provide for a more robust and streamlined calibration method.

As explained, the loops A, B, C, D and E can involve acquiring another image (e.g., per the blocks 1012 or 1020), which can be analyzed to determine whether one or more criteria are met. As explained, a method such as the method 1000 may proceed in a manual, semi-automated or automated manner for purposes of generating a calibrated digital microscopy system for 3D objects.

As an example, a system such as the system 400 can include one or more motors that can be utilized to move one or more components of the system 400. For example, consider a motor that can move the camera arm 403 up and down, a motor that can move the light source arm 404 up and down, a motor that can move the base 402 up and down, etc. As explained, the camera 405 and/or the lens 406 may be provided with automated focus and/or aperture adjustment features. As an example, the circuitry 408 may be operatively coupled to one or more motors (e.g., electromagnetic motors, etc.) to adjust one or more components of the system 400.

Referring to the table 820 of FIG. 8, as mentioned depending on the sensitivity of each parameter, certain verification and calibration actions can be programmed to be performed according to a particular frequency, which may be more or less frequent than for one or more other parameters. As an example, a system may provide for audible, visual and/or audible and visual indications as to a demand for parameter assessment. For example, consider a field scenario where a user may bump a component of a system, a field scenario where light conditions may change, a field scenario where characteristics of 3D objects may change or other field scenario that may occur such that one or more calibration processes may be indicated, triggered, etc.

As an example, a trained ML model can be a classifier that can classify data. For example, consider a classification score as to acceptable or unacceptable status, which may be accompanied by a regression value such as a quality score. In such an example, training can involve reward-based feedback for a neural network (NN) model, for example, to retrain the NN model in dynamic manner, for example, if a given classification does not match user expectation.

As explained, a system may implement clustering or grouping, which can be a problem of recognition of similarities. As an example, a combined regression (prediction) and classification ML model may be constructed. For example, consider an architecture with an input layer, hidden layers, and multiple output layers. In such an example, regression and classification output layers can be connected to a common last hidden layer of the model. Given two output layers, a model may be trained using two loss functions, for example, consider a mean squared error (MSE) loss for the regression output layer and a sparse categorical cross-entropy for the classification output layer. An example of a combined ML model for regression (prediction) and classification can be a ML model for determining the age of an abalone from physical details, where predicting the number of rings of the abalone is a proxy for the age of the abalone (e.g., age can be predicted as both a numerical value (in years) or a class label (ordinal year as a class)). In various examples, a trained ML model may output probability information. For example, consider a probability that input belongs to a particular class.

As to types of ML models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network (CNN), stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, backpropagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine learning model may be built using a computational framework with a library, a toolbox, etc., such as, for example, those of the MATLAB framework. The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pre-trained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs with optional CUDA (NVIDIA Corp., Santa Clara, California) and SYCL (The Khronos Group Inc., Beaverton, Oregon) extensions for general-purpose computing on graphics processing units (GPUs). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device and/or distributed devices may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (e.g., without round-trip to a server), privacy (e.g., where sensitive data can remain on the device), connectivity (e.g., operation without an Internet connection), size (e.g., reduced model and binary size) and power consumption (e.g., efficient computational inference and a lack of network connections). TFL offers multiple platform support, covering ANDROID and IOS devices, embedded LINUX, and microcontrollers. TFL offers diverse language support, which includes JAVA, SWIFT, Objective-C, C++, and PYTHON support. TFL offers high performance, with hardware acceleration and model optimization. TFL machine learning tasks may include, for example, data processing, image classification, object detection, pose estimation, question answering, text classification, etc., on multiple platforms. As an example, the system 400 of FIG. 4 may utilize one or more features of the TFL framework. For example, the circuitry 408 may implement TFL ML model features to perform one or more tasks (e.g., learning, classification, calibration, etc.).

Figure 11:
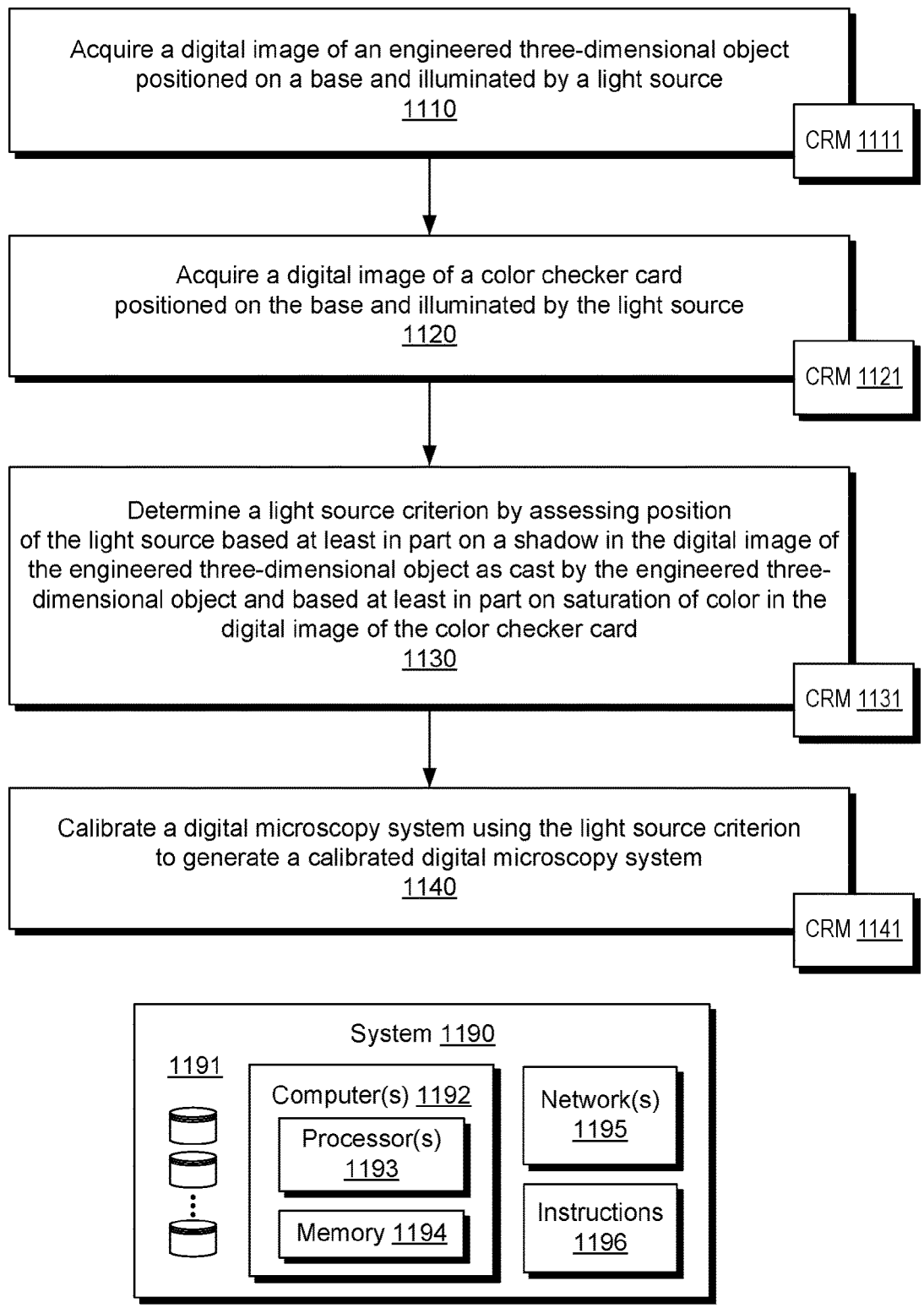
FIG. 11 illustrates an example of a method and an example of a system.

FIG. 11 shows an example of a method 1100 and an example of a system 1190. As shown, the method 1100 can include an acquisition block 1110 for, using a digital camera of a digital microscopy system, acquiring a digital image of an engineered three-dimensional object positioned on a base and illuminated by a light source; an acquisition block 1120 for, using the digital camera, acquiring a digital image of a color checker card positioned on the base and illuminated by the light source; a determination block 1130 for determining a light source criterion by assessing position of the light source based at least in part on a shadow in the digital image of the engineered three-dimensional object as cast by the engineered three-dimensional object and based at least in part on saturation of color in the digital image of the color checker card; and a calibration block 1140 for calibrating the digital microscopy system using the light source criterion to generate a calibrated digital microscopy system.

The method 1100 is shown in FIG. 11 in association with various computer-readable media (CRM) blocks 1111, 1121, 1131 and 1141. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and that is not a carrier wave. As an example, one or more of the blocks 1111, 1121, 1131 and 1141 may be in the form processor-executable instructions.

In the example of FIG. 11, the system 1190 includes one or more information storage devices 1191, one or more computers 1192, one or more networks 1195 and instructions 1196. As to the one or more computers 1192, each computer may include one or more processors (e.g., or processing cores) 1193 and memory 1194 for storing the instructions 1196, for example, executable by at least one of the one or more processors 1193 (see, e.g., the blocks 1111, 1121, 1131 and 1141). As an example, a computer may include one or more network interfaces (e.g., wired or wireless), one or more graphics cards, a display interface (e.g., wired or wireless), etc.

As an example, a method can include using a digital camera of a digital microscopy system, acquiring a digital image of an engineered three-dimensional object positioned on a base and illuminated by a light source of the digital microscopy system; using the digital camera, acquiring a digital image of a color checker card positioned on the base and illuminated by the light source; determining a light source criterion by assessing position of the light source based at least in part on a shadow in the digital image of the engineered three-dimensional object as cast by the engineered three-dimensional object and based at least in part on saturation of color in the digital image of the color checker card; and calibrating the digital microscopy system using the light source criterion to generate a calibrated digital microscopy system. In such an example, the light source criterion can be a distance measured from the base to the light source or, for example, an orientation of the light source with respect to the engineered three-dimensional object. As an example, calibrating can be via a machine, for example, consider circuitry operatively coupled to a motor that can be actuated via a command or commands to adjust a distance as to one or more components of a system according to one or more criteria and/or to adjust an orientation as to one or more components of a system according to one or more criteria.

As an example, a method can include, using a digital camera, acquiring a digital image of a field of view card positioned on a base and, for example, assessing the digital image of the field of view card to determine a digital camera criterion where the method can include calibrating a system using the digital camera criterion. In such an example, the digital camera criterion can be a distance measured from the base to the digital camera.

As an example, a method can include determining an aperture criterion by assessing color in a digital image of a color checker card. In such an example, assessing color in the digital image of the color checker card can include computing an error value between color components and reference color components.

As an example, a method can include setting one or more gains, which may be with respect to one or more colors of a sensor or sensors of a digital camera. In such an example, a digital file can be generated that includes digital imagery and information as to the one or more gains (e.g., consider metadata that specifies the one or more gains).

As an example, a color checker card can be utilized for calibrating a system that can acquire digital imagery of 3D objects using a digital camera. In such an example, a color checker card can include slanted-edge features where circuitry of a system can provide for computing a modulation transfer function (MTF) curve of MTF values versus frequency in cycles per unit distance based on the slanted-edge features in the digital image of the color checker card. In such an example, based on the MTF curve, circuitry of the system can provide for determining a sharpness criterion, where the sharpness criterion is an aperture value for an aperture of the digital camera.

As an example, a method can include generating a calibrated digital microscopy system and acquiring a digital image of a natural, three-dimensional object using the calibrated digital microscopy system. In such an example, the method can include characterizing the natural, three-dimensional object using the digital image of the natural, three-dimensional object to determine a lithology. As an example, a method can include processing a digital image of a natural, three-dimensional object to determine a fossil type. For example, material can include preserved remains, impression, or trace of a once-living thing from a past geological age (e.g., bones, shells, exoskeletons, stone imprints of animals or microbes).

As an example, a digital microscopy system can include an electromagnetic motor where a method can include calibrating the digital microscopy system at least in part by actuating the electromagnetic motor to adjust a position of a light source of the digital microscopy system and/or to adjust a position of a digital camera of the digital microscopy system. As an example, a position can be adjusted according to a distance, an orientation or another aspect of a system. As an example, an adjustment may be made responsive to a determination as to a metric or metrics utilized for calibrating. For example, circuitry can issue a command to an electromagnetic motor to actuate the electromagnetic motor to cause a change in position or changes in positions of one or more components as part of a calibration process.

As an example, a system can include a digital camera; a light source; a processor; memory accessible to the processor; and processor-executable instructions stored in the memory to instruct the system to: using the digital camera, acquire a digital image of an engineered three-dimensional object positioned on a base and illuminated by the light source; using the digital camera, acquire a digital image of a color checker card positioned on the base and illuminated by the light source; and determine a light source criterion using at least the processor via an assessment of position of the light source based at least in part on a shadow in the digital image of the engineered three-dimensional object as cast by the engineered three-dimensional object and based at least in part on saturation of color in the digital image of the color checker card. In such an example, the light source criterion can be a distance measured from the base to the light source. As explained, a digital microscopy system can include an electromagnetic motor actuatable to adjust a position of a light source of the digital microscopy system and/or to adjust a position of the digital camera of the digital microscopy system.

As an example, one or more non-transitory computer-readable storage media can include processor-executable instructions to instruct a computing system to: using a digital camera, acquire a digital image of an engineered three-dimensional object positioned on a base and illuminated by a light source; using the digital camera, acquire a digital image of a color checker card positioned on the base and illuminated by the light source; and determine a light source criterion via an assessment of position of the light source based at least in part on a shadow in the digital image of the engineered three-dimensional object as cast by the engineered three-dimensional object and based at least in part on saturation of color in the digital image of the color checker card. In such an example, the light source criterion can be a distance measured from the base to the light source.

As an example, a thickness of a sample tray or a thickness of a card may be taken into account such that either the sample tray or the card defines the distance from the base to the light source. For example, a distance measured from a base can be a distance measured from a sample tray platform or an upper surface of a card, either of which may be of the order of a millimeter to several millimeters thick. As an example, a distance can be a compensated distance, for example, consider a base that is disposed at a position where a sample tray or a card can be positioned on the base. In such an example, a distance can be compensated for a thickness of the sample tray or the card. In general, an adjustment that adjusts a distance to a base adjusts a distance to a sample tray or a card that is positioned on the base.

As explained, a color checker card can include slanted-edge features, where processor-executable instructions can include instructions to instruct a computing system to compute a modulation transfer function (MTF) curve of MTF values versus frequency in cycles per unit distance based on the slanted-edge features in a digital image of the color checker card and, based on the MTF curve, to determine a sharpness criterion, where the sharpness criterion can be an aperture value for an aperture of a digital camera that acquires the digital image of the color checker card.

As an example, a computer program product can include one or more computer-readable storage media that can include processor-executable instructions to instruct a computing system to perform one or more methods and/or one or more portions of a method.

Figure 12:
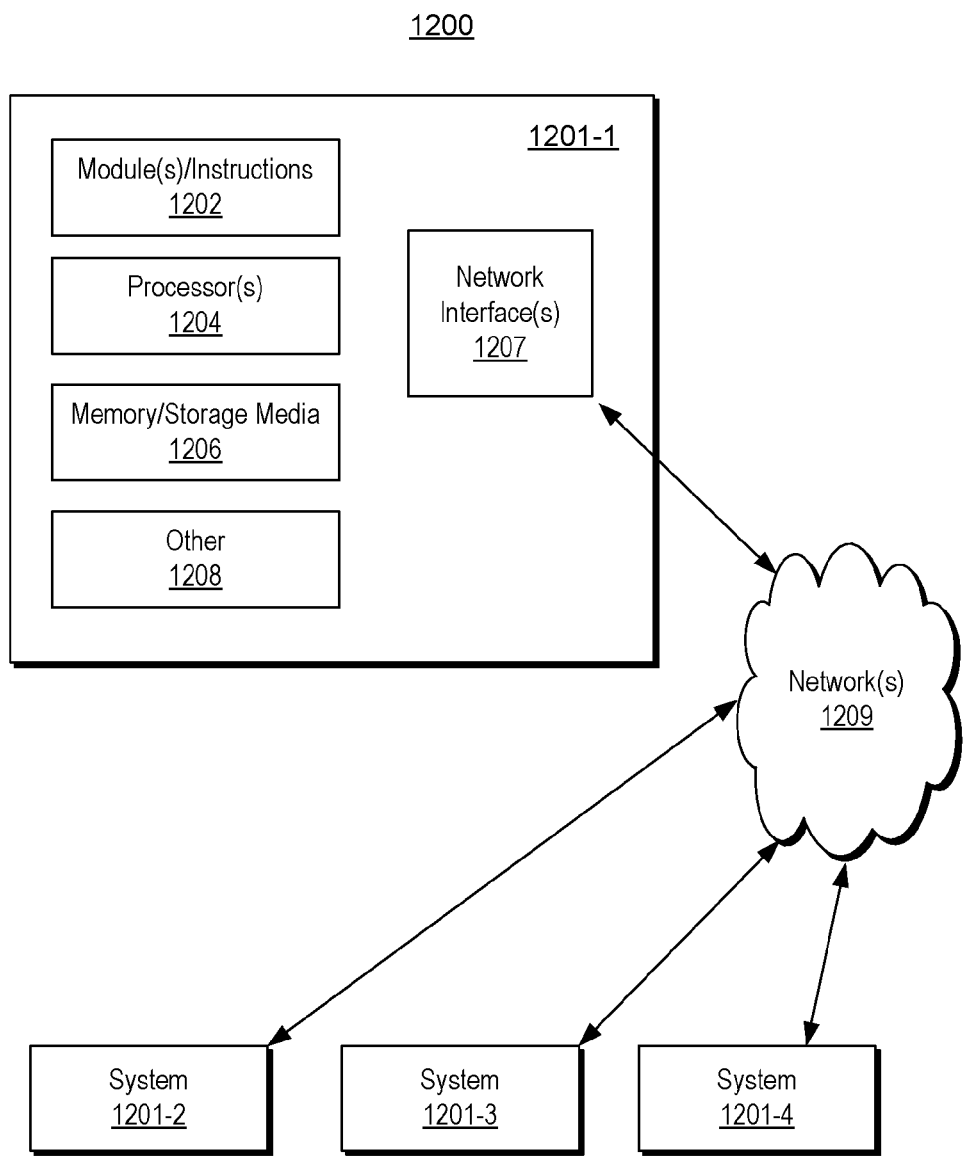
FIG. 12 illustrates examples of computer and network equipment.

In some embodiments, a method or methods may be executed by a computing system. FIG. 12 shows an example of a system 1200 that can include one or more computing systems 1201-1, 1201-2, 1201-3 and 1201-4, which may be operatively coupled via one or more networks 1209, which may include wired and/or wireless networks. As an example, the digital microscopy system 400 of FIG. 4 or another digital microscopy system can include various features of the system 1200 of FIG. 12 and/or be operatively coupled to one or more instances of the system 1200 of FIG. 12.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.).

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY disks, or other types of optical storage, or other types of storage devices.

As an example, a storage medium or media may be located in machine running machine-readable instructions or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 13:
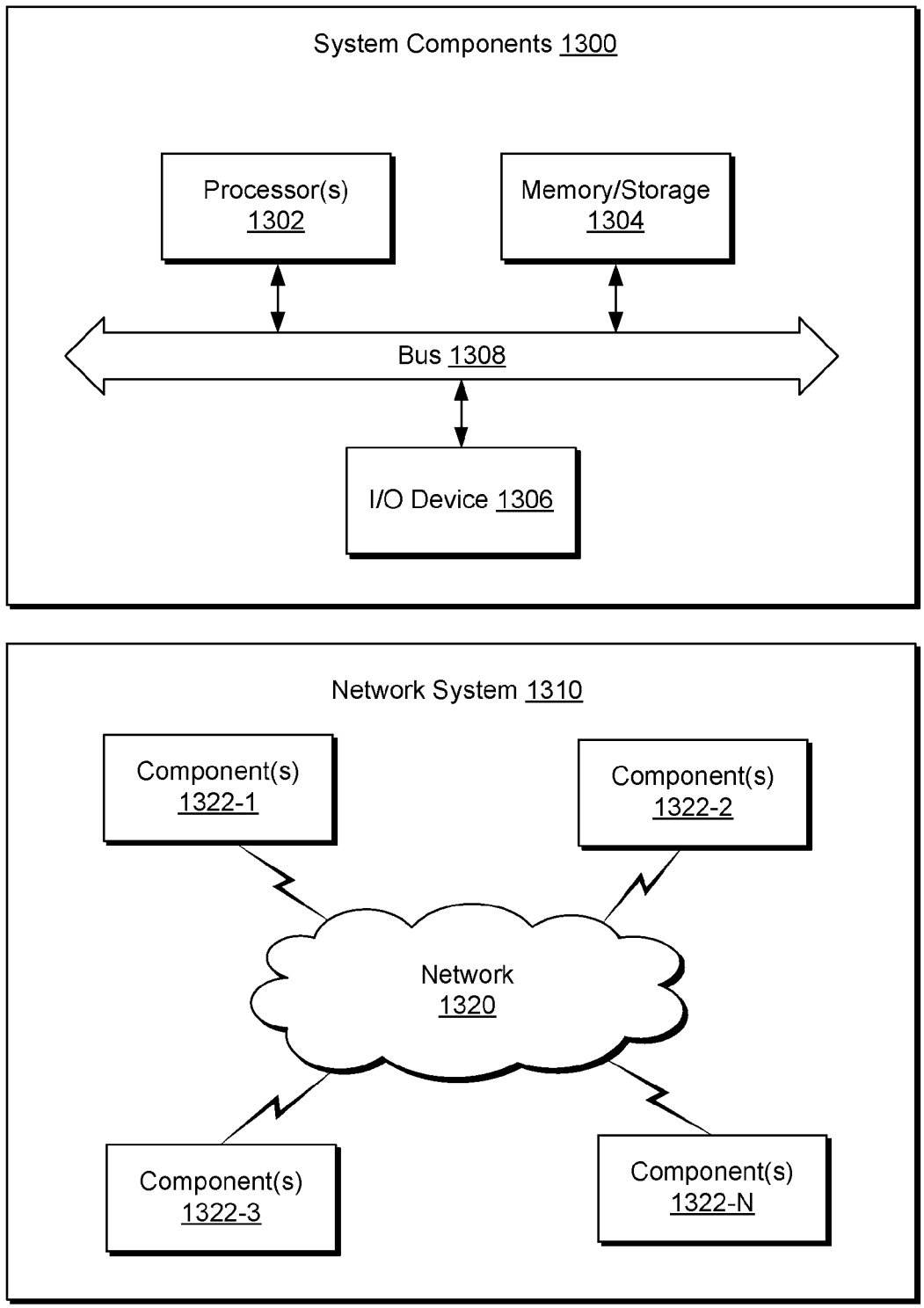
FIG. 13 illustrates example components of a system and a networked system.

FIG. 13 shows components of an example of a computing system 1300 and an example of a networked system 1310 with a network 1320. As an example, the digital microscopy system 400 of FIG. 4 or another digital microscopy system can include various features of the system 1300 and/or the system 1310 of FIG. 13 and/or be operatively coupled to one or more instances of the system 1300 and/or the system 1310 of FIG. 13.

In FIG. 13, the system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1322-2 may include an I/O device for display and optionally interaction with a method. The network 1320 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation.

As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    using a digital camera of a digital microscopy system, acquiring a digital image of an engineered three-dimensional object positioned on a base and illuminated by a light source of the digital microscopy system;
    using the digital camera, acquiring a digital image of a color checker card positioned on the base and illuminated by the light source;
    determining a light source criterion by assessing position of the light source based at least in part on a shadow in the digital image of the engineered three-dimensional object as cast by the engineered three-dimensional object and based at least in part on saturation of color in the digital image of the color checker card; and
    calibrating the digital microscopy system using the light source criterion to generate a calibrated digital microscopy system.

2. The method of claim 1, wherein the light source criterion comprises a distance measured from the base to the light source.

3. The method of claim 1, further comprising:
    using the digital camera, acquiring a digital image of a field of view card positioned on the base.

4. The method of claim 3, further comprising assessing the digital image of the field of view card to determine a digital camera criterion.

5. The method of claim 4, wherein the digital camera criterion comprises a distance measured from the base to the digital camera.

6. The method of claim 4, wherein the calibrating comprises using the digital camera criterion.

7. The method of claim 1, further comprising determining an aperture criterion by assessing color in the digital image of the color checker card.

8. The method of claim 7, wherein assessing color in the digital image of the color checker card comprises computing an error value between color components and reference color components.

9. The method of claim 1, wherein the color checker card comprises slanted-edge features and further comprising computing a modulation transfer function (MTF) curve of MTF values versus frequency in cycles per unit distance based on the slanted-edge features in the digital image of the color checker card.

10. The method of claim 9, further comprising:
    based on the MTF curve, determining a sharpness criterion, wherein the sharpness criterion comprises an aperture value for an aperture of the digital camera.

11. The method of claim 1, further comprising acquiring a digital image of a natural, three-dimensional object using the calibrated digital microscopy system.

12. The method of claim 11, further comprising characterizing the natural, three-dimensional object using the digital image of the natural, three-dimensional object to determine a lithology.

13. The method of claim 12, further comprising processing the digital image of the natural, three-dimensional object to determine a fossil type.

14. The method of claim 1, wherein the digital microscopy system further comprises an electromagnetic motor, and wherein the calibrating comprises actuating the electromagnetic motor to adjust a position of the light source of the digital microscopy system or to adjust a position of the digital camera of the digital microscopy system.

15. A system comprising:
    a digital camera;
    a light source;
    a processor;
    memory accessible to the processor; and
    processor-executable instructions stored in the memory to instruct the system to:
        using the digital camera, acquire a digital image of an engineered three-dimensional object positioned on a base and illuminated by the light source;
        using the digital camera, acquire a digital image of a color checker card positioned on the base and illuminated by the light source; and
        determine a light source criterion using at least the processor via an assessment of position of the light source based at least in part on a shadow in the digital image of the engineered three-dimensional object as cast by the engineered three-dimensional object and based at least in part on saturation of color in the digital image of the color checker card.

16. The system of claim 15, wherein the light source criterion comprises a distance measured from the base to the light source.

17. The system of claim 15, further comprising an electromagnetic motor actuatable to adjust a position of the light source of the digital microscopy system or to adjust a position of the digital camera of the digital microscopy system.

18. One or more non-transitory computer-readable storage media comprising processor-executable instructions to instruct a computing system to:
    using a digital camera, acquire a digital image of an engineered three-dimensional object positioned on a base and illuminated by a light source;
    using the digital camera, acquire a digital image of a color checker card positioned on the base and illuminated by the light source; and
    determine a light source criterion via an assessment of position of the light source based at least in part on a shadow in the digital image of the engineered three-dimensional object as cast by the engineered three-dimensional object and based at least in part on saturation of color in the digital image of the color checker card.

19. The one or more non-transitory computer-readable media of claim 18, wherein the light source criterion comprises a distance measured from the base to the light source.

20. The one or more non-transitory computer-readable media of claim 18, wherein the color checker card comprises slanted-edge features, wherein the processor-executable instructions comprise instructions to instruct a computing system to compute a modulation transfer function (MTF) curve of MTF values versus frequency in cycles per unit distance based on the slanted-edge features in the digital image of the color checker card and, based on the MTF curve, to determine a sharpness criterion, wherein the sharpness criterion comprises an aperture value for an aperture of the digital camera.

* * * * *